US012624744B2

(12) United States Patent
Nakajima et al.

(10) Patent No.: US 12,624,744 B2
(45) Date of Patent: May 12, 2026

(54) RAW EDGE COGGED V-BELT, METHOD FOR USING SAME, AND BELT TRANSMISSION MECHANISM

(71) Applicant: Mitsuboshi Belting Ltd., Kobe (JP)

(72) Inventors: Hidetaka Nakajima, Hyogo (JP); Keiji Takano, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 18/865,961

(22) PCT Filed: May 15, 2023

(86) PCT No.: PCT/JP2023/018187

§ 371 (c)(1),
(2) Date: Nov. 14, 2024

(87) PCT Pub. No.: WO2023/224019

PCT Pub. Date: Nov. 23, 2023

(65) Prior Publication Data

US 2025/0314285 A1     Oct. 9, 2025

(30) Foreign Application Priority Data

May 16, 2022   (JP) ................................ 2022-080410
Apr. 27, 2023   (JP) ................................ 2023-073007

(51) Int. Cl.
*F16G 5/20*          (2006.01)
*F16G 5/08*          (2006.01)
*F16H 9/18*          (2006.01)

(52) U.S. Cl.
CPC ................. *F16G 5/20* (2013.01); *F16G 5/08* (2013.01); *F16H 9/18* (2013.01)

(58) Field of Classification Search
CPC ................. F16G 5/08; F16G 5/00; F16H 9/18
See application file for complete search history.

(56) References Cited

U.S. PATENT DOCUMENTS 4,509,938 A * 4/1985 Woodland ................. F16G 5/20
                                                        474/263
4,571,230 A * 2/1986 Woodland ................. F16G 5/20
                                                        474/263

FOREIGN PATENT DOCUMENTS

JP     2004-188776 A     7/2004
JP     2006-002836 A     1/2006
JP     2006-226420 A     8/2006
JP     2007-144714 A     6/2007
(Continued)

OTHER PUBLICATIONS

Jun. 13, 2023—International Search Report—Intl App PCT/JP2023/018187.

*Primary Examiner* — Victoria P Augustine
*Assistant Examiner* — Mark K Buse
(74) *Attorney, Agent, or Firm* — Banner & Witcoff, Ltd.

(57) ABSTRACT

The present invention relates to a raw edge cogged V-belt, including: a cog at least on an inner circumferential surface side; and a compression rubber layer disposed on the inner circumferential surface side, in which the compression rubber layer includes a compression rubber layer main body and an inner surface layer covering an inner circumferential surface of the compression rubber layer main body, and a friction coefficient of a surface of the inner surface layer is higher than a friction coefficient of a surface of the compression rubber layer main body that is not covered with the inner surface layer.

6 Claims, 4 Drawing Sheets

A DIRECTION (LONGITUDINAL DIRECTION)

B DIRECTION (WIDTH DIRECTION)

(56) References Cited

FOREIGN PATENT DOCUMENTS

| JP | 2009-051204 | A | 3/2009 |
|----|-------------|---|--------|
| JP | 2009-156289 | A | 7/2009 |
| WO | 2011-046740 | A1 | 4/2011 |
| WO | WO2011046740 | * | 4/2011 |
| WO | 2019-209739 | A1 | 10/2019 |

* cited by examiner (a)

(b)

RAW EDGE COGGED V-BELT, METHOD FOR USING SAME, AND BELT TRANSMISSION MECHANISM

CROSS REFERENCE TO RELATED APPLICATIONS

This is a U.S. National Phase Application under 35 U.S.C. § 371 of International Application No. PCT/JP2023/018187, filed May 15, 2023, which claims priority to Japanese Application Nos. 2022-080410, filed May 16, 2022, and 2023-073007, filed Apr. 27, 2023, which were published Under PCT Article 21 (2), the entire contents of which are incorporated herein by reference.

TECHNICAL FIELD

The present invention relates to a raw edge cogged V-belt for use in a belt-type continuously variable transmission, a method for using the same, and a belt power-transmission system.

BACKGROUND ART

A V-belt for transmitting power by frictional power-transmission includes a raw edge type (raw edge V-belt) that is a rubber layer in which a frictional power-transmission surface (V-shaped side surface) is exposed, and a wrapped type (wrapped V-belt) in which a frictional power-transmission surface is covered with a cover fabric, and is selectively used according to use depending on a difference in surface properties (friction coefficient between the rubber layer and the cover fabric) of the frictional power-transmission surface. Examples of the raw edge type V-belt include a raw edge V-belt in which cogs are not provided, a raw edge cogged V-belt in which cogs are provided only on a lower surface (inner circumferential surface) of the belt to improve bendability, and a raw edge cogged V-belt (raw edge double cogged V-belt) in which cogs are provided on both a lower surface (inner circumferential surface) and an upper surface (outer circumferential surface) of the belt to improve bendability.

The raw edge V-belt and the raw edge cogged V-belt are mainly used for driving a general industrial machine and an agricultural machine, for driving accessories in an engine of an automobile, and the like. As other uses, there is a raw edge cogged V-belt, called a variable speed belt which is used in a belt-type continuously variable transmission (CVT) for a motorcycle (scooter), a snowmobile (small snowcat), an all-terrain vehicle (ATV), and the like.

As illustrated in FIG. 1, a belt-type CVT 20 is a system that continuously changes a gear ratio by winding a V-belt 23 around a driving pulley 21 and a driven pulley 22. The pulleys 21 and 22 respectively include fixed sheaves 21a and 22a which are fixed or restricted from moving in an axial direction, and movable sheaves 21b and 22b which are movable in the axial direction, and inner circumferential walls of the fixed sheaves 21a and 22a and inner circumferential walls of the movable sheaves 21b and 22b form inclined opposing surfaces of a V-shaped groove. The pulleys 21 and 22 respectively have a structure in which widths of the V-shaped groove of the pulleys 21 and 22 formed by these fixed sheaves 21a and 22a and movable sheaves 21b and 22b can be continuously changed. Both end surfaces in a width direction of the V-belt 23 are formed as tapered surfaces having an inclination corresponding to the inclined opposing surfaces of the V-shaped groove of the respective pulleys 21 and 22, and are engaged with any position in an up-down direction on the opposing surfaces of the V-shaped grooves according to the changed widths of the V-shaped grooves. For example, when a state illustrated in (a) of FIG. 1 is changed to a state illustrated in (b) of FIG. 1 by decreasing the width of the V-shaped groove of the driving pulley 21 and increasing the width of the V-shaped groove of the driven pulley 22, the raw edge cogged V-belt 23 moves upward in the V-shaped groove on a driving pulley 21 side and moves downward in the V-shaped groove on a driven pulley 22 side, and a radius of winding across the respective pulleys 21 and 22 changes continuously, making it possible to continuously change the gear ratio.

For example, a CVT for a motorcycle includes a driving pulley fixed around a crankshaft of an engine, a driven pulley connected to a driving shaft of a rear wheel via a gear or the like, and a V-belt wound around the driving pulley and the driven pulley.

At a low speed, a movable sheave of the driving pulley moves away from a fixed sheave, the radius of winding across the driving pulley becomes smaller, and a movable sheave of the driven pulley moves closer to a fixed sheave, and the radius of winding across the driven pulley becomes larger. Therefore, the rear wheel is driven with a large torque at a low speed. On the other hand, at a high speed, the movable sheave of the driving pulley moves closer to the fixed sheave, the radius of winding across the driving pulley becomes larger, and the movable sheave of the driven pulley moves away from the fixed sheave, and the radius of winding across the driven pulley becomes smaller. Therefore, the rear wheel is driven with a small torque at a high speed.

On the other hand, there is a difference between a motorcycle and a snowmobile or an all-terrain vehicle in a clutch system (system that temporarily interrupts transmission of power) during idling.

That is, in the motorcycle, an automatic centrifugal clutch is provided between the rear wheel and the driven pulley. This clutch blocks torque transmission from the driven pulley to the rear wheel during idling. Therefore, even if the driven pulley rotates during idling, the rear wheel does not rotate.

On the other hand, in a case of a CVT in a snowmobile or an all-terrain vehicle, the automatic centrifugal clutch is not provided, but the movable sheave is moved during idling until a side surface of a V-belt is completely separated from the movable or fixed sheave, thereby blocking torque transmission from the driving pulley to the V-belt. That is, the V-belt dropped into the bottom of a groove (shaft portion) of the pulley during idling, that is, a lower surface (inner circumferential surface) of the V-belt coming into contact with the shaft portion acts as a belt clutch that temporarily interrupts the power transmission (the shaft portion of the driving pulley acts as an idler pulley). Such a transmission is referred to as a belt clutch-in type CVT.

FIG. 2 is a schematic diagram illustrating a state of the belt clutch-in type CVT during idling. As illustrated in FIG. 2, in a belt clutch-in type CVT 30, a V-belt 33 does not come into contact with either a movable sheave 31b or a fixed sheave 31a of a driving pulley 31, but comes into contact with a pulley shaft portion 31c of the driving pulley 31. That is, in the automatic centrifugal clutch type of the CVT of the motorcycle, the V-belt comes into contact with the sheaves of the pulleys even during idling as illustrated in FIG. 1, whereas in the belt clutch type CVT of the CVT in the snowmobile or the all-terrain vehicle, an inner circumferential surface of the V-belt comes into contact with an outer circumferential surface of the pulley shaft portion of the driving pulley (a general pulley shaft portion having a smooth outer circumferential surface).

The following belts are known as variable speed belts specialized for the belt clutch-in type CVT, that is, a belt whose bottom surface (inner circumferential surface) comes into contact with a pulley shaft during engine idling.

JP2004-188776A (Patent Literature 1) discloses a method for producing a V-belt as a variable speed belt used in a transmission of a two-wheeled vehicle, an all-terrain vehicle, a snowmobile, or the like, in which a canvas fabric is attached to a bottom surface via a rubber layer to prevent the bottom surface from being rubber, thereby preventing bottom rubber from sticking to the shaft.

JP2006-2836A (Patent Literature 2) discloses a raw edge belt in which a belt bottom surface that slides in contact with a sheave shaft is configured by a canvas fabric surface that is not coated with rubber paste, so that a friction coefficient of the bottom surface is 0.1 or less, and rubber does not fall off (rubber powder does not fall off), so that there is no risk of fallen rubber getting into a gap around the sheave shaft and causing a malfunction.

JP2006-226420A (Patent Literature 3) discloses a power-transmission belt in which a canvas fabric is exposed on a surface of a compression rubber layer that comes into contact with a pulley recess, and no rubber is attached to the canvas fabric at a contact portion with the pulley recess, thereby being able to eliminate the rubber attaching to the belt surface in contact with the pulley recess, to lower the friction coefficient, and to prevent noise.

JP2007-144714A (Patent Literature 4) discloses a V-belt in which a belt bottom surface is covered with a canvas fabric that is coated only on a belt main body side, thereby preventing rubber from seeping out onto a canvas fabric surface and preventing generation of abnormal noise and a driving force.

JP2009-51204A (Patent Literature 5) discloses a cogged V-belt that can be produced without attaching rubber to a canvas fabric by using the tubular canvas fabric with elastic threads as threads in a belt circumferential direction in a process of winding the canvas fabric around a mold to temporarily fix the canvas fabric, and that can prevent scattering of rubber debris even when the belt is dropped in a belt clutch-in type CVT.

JP2009-156289A (Patent Literature 6) discloses a V-belt in which Teflon (registered trademark) is coated onto a lower canvas fabric, and rubber used to adhere the lower canvas fabric to bottom rubber is not allowed to penetrate a surface, so that a friction coefficient with a crankshaft can be reduced and torque transmitted from the crankshaft to the V-belt during idling can be reduced.

On the other hand, compared with the automatic centrifugal clutch type, the belt clutch-in type has poor engine braking performance, and thus a mechanism that utilizes contact between an idler pulley and an inner circumferential surface of a variable speed belt during idling to act as an engine braking system (EBS) that brakes a driven pulley (rear wheel) with a frictional force is being studied.

WO2011/046740 (Patent Literature 7) and WO2019/209739 (Patent Literature 8) disclose a continuously variable transmission engine braking system that adds a braking function by meshing with an idler pulley (shaft portion) that has a projection and a recess corresponding to a projection and a recess (cog) on an inner circumferential surface of a V-belt.

CITATION LIST

Patent Literature

Patent Literature 1: JP2004-188776A
Patent Literature 2: JP2006-2836A
Patent Literature 3: JP2006-226420A
Patent Literature 4: JP2007-144714A
Patent Literature 5: JP2009-51204A
Patent Literature 6: JP2009-156289A
Patent Literature 7: WO2011/046740
Patent Literature 8: WO2019/209739

SUMMARY OF INVENTION

Technical Problem

An object of the V-belt in each of Patent Literatures 1 to 6 is to make the belt bottom surface slippery (lowering the friction coefficient) in order to prevent problems (such as generation of abnormal noise or driving force, and scattering of rubber) caused by the belt bottom surface rubbing against the pulley shaft, and the engine braking performance (braking function) of the belt clutch-in type is not described. Furthermore, the V-belts of Patent Literatures 1 to 6 do not provide a sufficient frictional force to obtain a sufficient braking function, and therefore cannot exhibit the braking function. Therefore, the exhibition of the braking function by shortening a braking distance and time, and maintenance of the braking function becomes problems, and development of a V-belt having a high-level braking function (high frictional force) is required.

On the other hand, the continuously variable transmission engine braking system of each of Patent Documents 7 and 8 requires a pulley with a special shape.

Among raw edge V-belts, a CVT use requires lateral pressure resistance with highest level, and in order to be applicable to such a use, rigidity higher than that in other uses is required in a compression rubber layer. Therefore, in the CVT use, bendability is inevitably insufficient, and thus a cog is essential. That is, high rigidity rubber and the cog portion are essential components for the CVT use. On the other hand, in order to bring the belt inner circumferential surface into contact with the pulley shaft portion to exert a braking effect (frictional force), a belt with a flat inner circumferential surface (without the cog) in which a contact area increases is advantageous. However, since the cog is essential for the CVT use, the only part of the belt inner circumferential surface (bottom surface) that comes into contact with the pulley shaft portion (a shaft portion of a general pulley having a smooth outer circumferential surface without any projection or recess formed for engaging with the belt) is the top portion of the cog, making it difficult to improve the frictional force (braking function). That is, in the raw edge V-belt used for the CVT use, both lateral pressure resistance and improvement of the braking function are properties in a trade-off relationship that is difficult to achieve.

Therefore, an object of the present invention is to provide a raw edge cogged V-belt that can be applied as a braking system for a belt clutch-in type continuously variable transmission, a method for using the same, and a belt power-transmission system.

Solution to Problem

In order to achieve the above object, the inventors have discovered that a raw edge cogged V-belt can be applied as a braking system of a belt clutch-in type continuously variable transmission by configuring a compression rubber layer of the raw edge cogged V-belt as a combination of a compression rubber layer main body and an inner surface layer that covers an inner circumferential surface of the compression rubber layer main body and has a surface with a friction coefficient greater than that of a surface of the compression rubber layer main body, and have completed the present invention.

That is, a raw edge cogged V-belt according to aspect [I] of the present invention is a raw edge cogged V-belt including:

a cog at least on an inner circumferential surface side; and a compression rubber layer disposed on the inner circum-
  ferential surface side, in which the compression rubber layer comprises a compression
  rubber layer main body and an inner surface layer
  covering an inner circumferential surface of the com-
  pression rubber layer main body, and a friction coefficient of a surface of the inner surface layer
  is higher than a friction coefficient of a surface of the
  compression rubber layer main body that is not covered
  with the inner surface layer.

Aspect [II] of the present invention is an aspect according to aspect [I], in which the friction coefficient of the surface of the inner surface layer is 0.4 to 0.7.

Aspect [III] of the present invention is an aspect according to aspect [I] or [II], in which an average thickness of the inner surface layer is 0.3 mm to 2 mm.

Aspect [IV] of the present invention is an aspect according to any one of aspects [I] to [III], in which a rubber hardness Hs (type A) of the inner surface layer is 82° or less, and a rubber hardness Hs (type A) of the compression rubber layer main body is 89° or more.

The present invention also includes, as aspect [V], a belt power-transmission system including the raw edge cogged V-belt according to any one of aspects [I] to [IV] and a pulley, in which the raw edge cogged V-belt is a variable speed belt used in a belt clutch-in type continuously variable transmission.

Aspect [VI] of the present invention is an aspect according to aspect [V], in which the belt clutch-in type continuously variable transmission is a continuously variable transmission in which a belt inner circumferential surface comes into contact with a pulley shaft portion during idling.

Aspect [VII] of the present invention is an aspect according to aspect [V] or [VI], in which the belt clutch-in type continuously variable transmission is a continuously variable transmission having a braking system that utilizes a frictional force between the belt inner circumferential surface and the pulley shaft portion.

The present invention also includes, as aspect [VIII], a method for using the raw edge cogged V-belt according to any one of aspects [I] to [IV] in which the raw edge cogged V-belt is involved in all of a continuously variable transmission, a clutch, and a braking in a belt clutch-in type continuously variable transmission.

Advantageous Effects of Invention

In the present invention, since the compression rubber layer of the raw edge cogged V-belt is configured as the combination of the compression rubber layer main body and the inner surface layer that covers the inner circumferential surface of the compression rubber layer main body and has the surface with the friction coefficient greater than that of the surface of the compression rubber layer main body, a braking function (high frictional force) can be added to the belt inner circumferential surface, and the raw edge cogged V-belt can be applied as a braking system of a belt clutch-in type continuously variable transmission mounted on a snow-mobile, an all-terrain vehicle, or the like. That is, in the present invention, the frictional force of the belt inner circumferential surface can be improved while maintaining bending fatigue resistance and lateral pressure resistance, and thus the braking function (high frictional force) can be exhibited even for the pulley shaft portion. In particular, since the inner circumferential surface of the specific compression rubber layer main body is covered with a specific surface layer (rubber composition with high friction coefficient), the braking function can be added while maintaining heat resistance, lateral pressure resistance, and bending fatigue resistance of a variable speed belt.

DESCRIPTION OF EMBODIMENTS

[Configuration of Raw Edge Cogged V-Belt]

A raw edge cogged V-belt of the present invention is not particularly limited as long as the raw edge cogged V-belt includes a compression rubber layer having a specific two-layer structure including a compression rubber layer main body and a surface layer (inner surface layer). The raw edge cogged V-belt can be roughly classified into a raw edge cogged V-belt in which a cog is formed only on an inner circumferential side of the raw edge V-belt, and a raw edge double cogged V-belt in which cogs are formed on both the inner circumferential side and an outer circumferential side of the raw edge V-belt. Among these, a raw edge double cogged V-belt is particularly preferred from a viewpoint of being used in a more severe situation and being required to satisfy both lateral pressure resistance and bending fatigue resistance at a high level.

Figure 3:
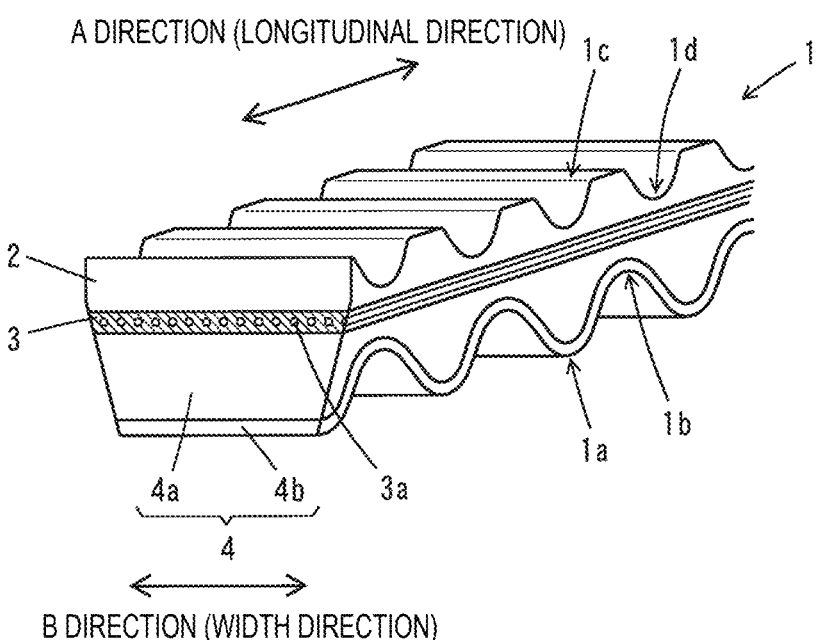
FIG. 3 is a schematic partial cross-sectional perspective view illustrating an example of a raw edge double cogged V-belt of the present invention.
Figure 4:
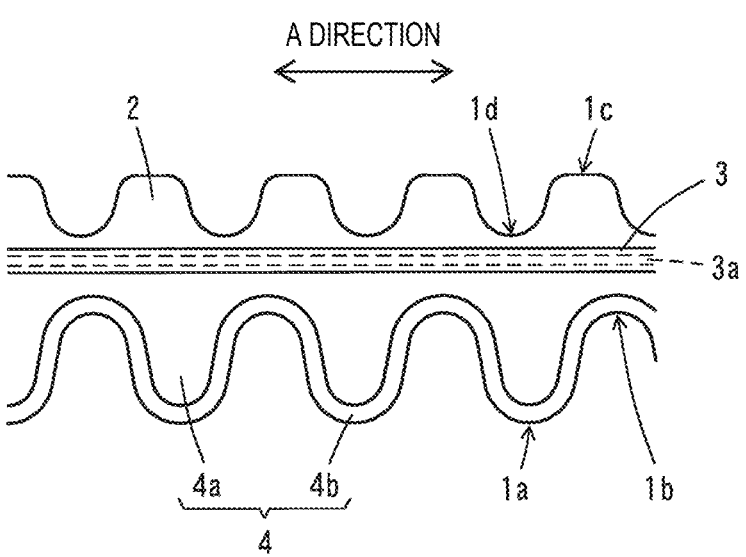
FIG. 4 is a schematic cross-sectional view in which the raw edge double cogged V-belt in FIG. 3 is cut in a belt longitudinal direction.

FIG. 3 is a schematic partial cross-sectional perspective view illustrating an example of a raw edge double cogged V-belt of the present invention, and FIG. 4 is a schematic cross-sectional view in which the raw edge double cogged V-belt of FIG. 3 is cut in a belt longitudinal direction.

In the example, a raw edge double cogged V-belt 1 has an inner circumferential cog portion formed by alternately arranging an inner circumferential cog ridge 1a and an inner circumferential cog valley 1b along a belt longitudinal direction (A direction in the figure) on an inner circumferential surface of a compression rubber layer 4, a cross-sectional shape in the longitudinal direction of the inner circumferential cog ridge 1a is a substantially semicircular shape (curved shape or wave shape), and a cross-sectional shape in a direction (width direction or B direction in the figure) orthogonal to the longitudinal direction is a trapezoidal shape. That is, each inner circumferential cog ridge 1a protrudes in a substantially semicircular shape in the cross section in the A direction from the inner circumferential cog valley 1b in a belt thickness direction.

Furthermore, an outer circumferential surface also has an outer circumferential cog portion formed by alternately arranging an outer circumferential cog ridge 1c and an outer circumferential cog valley 1d along the belt longitudinal direction, and a cross-sectional shape in the longitudinal direction of the outer circumferential cog ridge 1c is a substantially trapezoidal shape, and a cross-sectional shape in a direction (width direction or B direction in the figure) perpendicular to the longitudinal direction is a substantially rectangular shape. That is, each outer circumferential cog ridge 1c protrudes in a substantially trapezoidal shape in the cross section in the A direction from the outer circumferential cog valley 1d in the belt thickness direction.

The raw edge double cogged V-belt has a laminated structure, in which a tension rubber layer 2, a tension member layer (adhesion rubber layer) 3, a compression rubber layer main body 4a, and an inner surface layer 4b of a compression rubber layer are laminated in this order from an outer circumferential side to an inner circumferential side of the belt. The cross-sectional shape in a belt width direction is a substantially trapezoidal shape in which a belt width decreases from the outer circumferential side toward the inner circumferential side of the belt. Furthermore, a tension member 3a is embedded in the tension member layer 3, and the inner circumferential cog portion and the outer circumferential cog portion are formed into the compression rubber layer 4 and the tension rubber layer 2 by a molding die with cogs, respectively.

Figure 1:
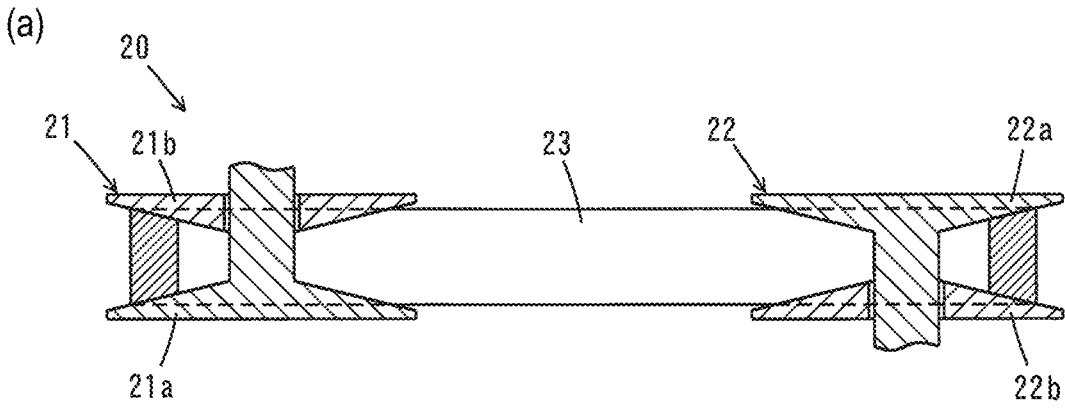
FIG. 1 is a schematic view for illustrating a transmission system of a belt-type continuously variable transmission.
Figure 1:
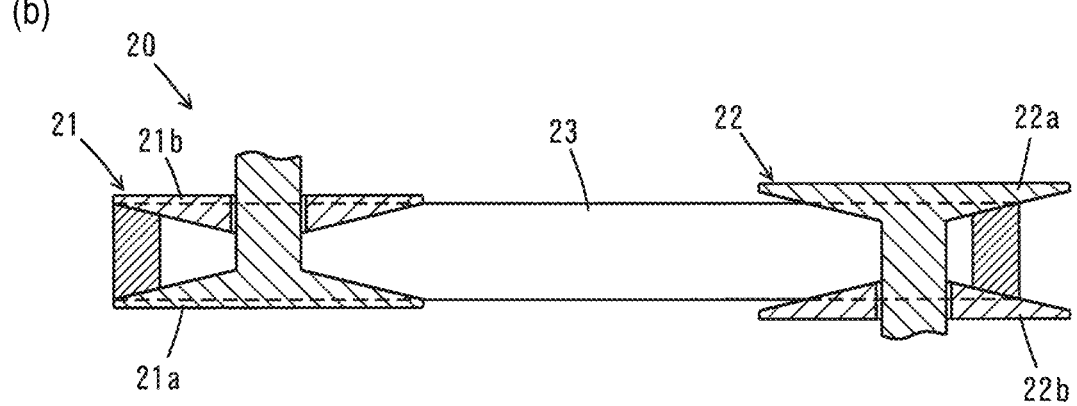
Figure 2:
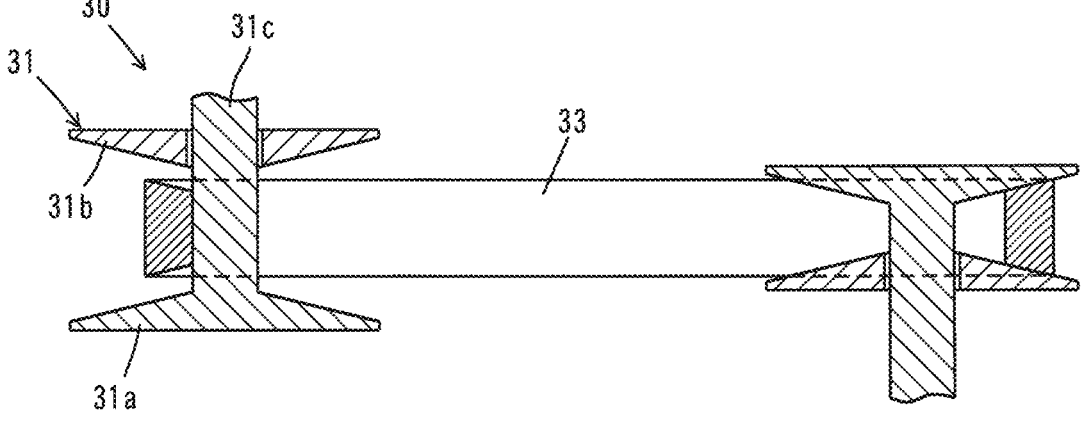
FIG. 2 is a schematic diagram illustrating a state of a belt clutch-in type continuously variable transmission during idling.
Figure 5:
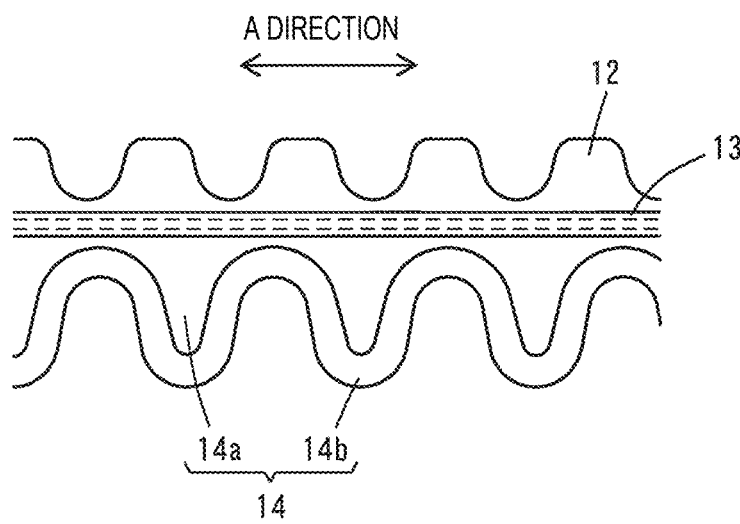
FIG. 5 is a schematic cross-sectional view in which another example of the raw edge double cogged V-belt of the present invention is cut in the belt longitudinal direction.

FIG. 5 is a schematic cross-sectional view in which another example of the raw edge double cogged V-belt of the present invention is cut in the belt longitudinal direction. The raw edge double cogged V-belt of FIG. 5 includes a tension rubber layer 12, a tension member layer (adhesion rubber layer) 13, and a compression rubber layer 14. In this example, in the compression rubber layer 14 including a main body 14a, an inner surface layer 14b is formed to be thicker than that of the raw edge double cogged V-belt of FIG. 1. In this example, as compared with the raw edge double cogged V-belt of FIG. 1, lateral pressure resistance is slightly lower, but persistence of braking performance is a bit improved.

Figure 6:
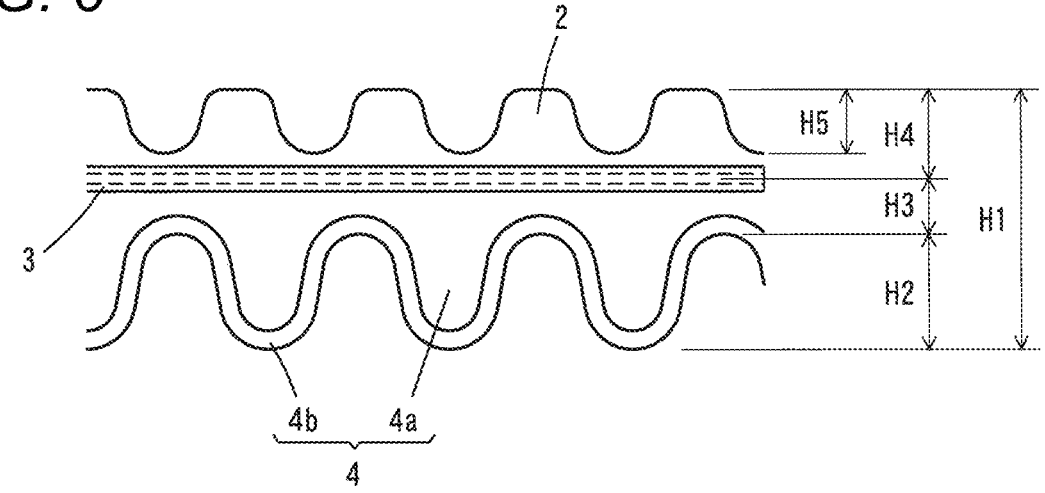
FIG. 6 is a schematic cross-sectional view illustrating definitions of an entire thickness, a height of a cog portion, a thickness of a valley portion, and the like of the raw edge double cogged V-belt in the present application.

Based on FIG. 4, definitions of an entire thickness, heights of the cog portions, thicknesses of the valley portions, and the like of the raw edge cogged V-belt of the present invention are shown in FIG. 6. A thickness H1 (average thickness) of the entire belt of the raw edge cogged V-belt of the present invention is, for example, 8 mm to 19 mm, preferably 10 mm to 19 mm, more preferably 13 mm to 19 mm, and still more preferably 14 mm to 16 mm. If the thickness is too small, the lateral pressure resistance may decrease, and if the thickness is too large, the bendability may decrease, power-transmission efficiency may decrease, and the bending fatigue resistance may decrease.

As illustrated in FIG. 6, in the present application, in the case where the tension rubber layer and/or the compression rubber layer has the cog portion, the thickness of the entire belt means a thickness (maximum thickness of the belt) of a top portion of the cog portion.

In the present application, the inner circumferential cog valley of the inner circumferential cog portion means a portion that forms a thin portion of the compression rubber layer having the inner circumferential cog portion, and usually means a curved or planar valley portion or groove portion (a curved groove portion or a planar groove portion parallel to a belt surface direction) between the adjacent inner circumferential cog ridges that protrude toward the inner circumferential side of the belt.

A height H2 (inner circumferential cog height) of the inner circumferential cog portion formed on the inner circumferential surface may be selected from a range of, for example, 4 mm to 8 mm, and preferably 5 mm to 7 mm. A height H5 (outer circumferential cog height) of the outer circumferential cog portion formed on the outer circumferential surface may be selected from a range of, for example, 2 mm to 5 mm, and preferably 3 mm to 4 mm.

An outer circumferential pitch height H4, which is a distance from the center of the tension member to the outer circumferential surface (top portion of cog portion), is, for example, 4 mm to 8 mm, and preferably 5 mm to 7 mm, and a center-valley thickness H3, which is a distance from the center of the tension member to a deepest portion of the inner circumferential cog valley, is, for example, 1 mm to 9 mm, and preferably 2 mm to 8 mm.

[Compression Rubber Layer]

The compression rubber layer includes a main body of a compression rubber layer (compression rubber layer main body) formed of a rubber composition (crosslinked rubber composition), and a surface layer (inner surface layer) that covers a belt inner circumferential surface of the main body and has a surface with a larger friction coefficient than that of a surface of the main body. It is sufficient that the compression rubber layer includes the compression rubber layer main body and the inner surface layer, and the compression rubber layer may include another layer (for example, another rubber layer interposed between the compression rubber layer main body and the inner surface layer), but a two-layer structure including the compression rubber layer main body and the inner surface layer is preferable from a viewpoint of mechanical properties and productivity of the compression rubber layer. In the present invention, the compression rubber layer is formed into a two-layer structure including the main body and the inner surface layer, so that a braking function (high frictional force) can be added to the belt inner circumferential surface while the heat resistance, the lateral pressure resistance, and the bending fatigue resistance required for a variable speed belt are maintained.

The average thickness of the compression rubber layer (total of main body and inner surface layer) can be appropriately selected according to the type of belt, and is, for example, 7 mm to 13 mm, preferably 8 mm to 12 mm, and more preferably 9 mm to 11 mm. In the present application, the thickness of the compression rubber layer means a thickness of the top portion of the inner circumferential cog portion.

(Compression Rubber Layer Main Body)

In the raw edge cogged V-belt of the present invention, the compression rubber layer main body is formed of a rubber composition (crosslinked rubber composition) containing a first rubber component.

(A1) First Rubber Component

As the first rubber component, a vulcanizable or cross-linkable rubber may be used, such as a diene rubber [such as a natural rubber (NR), an isoprene rubber (IR), a butadiene rubber (BR), a chloroprene rubber (CR), a styrene butadiene rubber (SBR), an acrylonitrile butadiene rubber (NBR), and a hydrogenated nitrile rubber (H-NBR)], an ethylene-α-olefin elastomer [such as an ethylene-propylene copolymer (EPM) and an ethylene-propylene-diene terpolymer (EPDM)], a chlorosulfonated polyethylene rubber, an alkylated chlorosulfonated polyethylene rubber, an epichlorohydrin rubber, an acrylic rubber, a silicone rubber, an urethane rubber, and a fluorine rubber. Those rubber components may be used alone or in combination of two or more kinds thereof.

Among those, the ethylene-α-olefin elastomer and the chloroprene rubber are preferred, and the chloroprene rubber is particularly preferred from a viewpoint of excellent balance of heat resistance, abrasion resistance, oil resistance, and the like, and high productivity.

When the first rubber component contains the chloroprene rubber, from a viewpoint of being capable of improving the properties and productivity, a proportion of the chloroprene rubber in the first rubber component may be 50 mass % or more, preferably 80 mass % or more, more preferably 90 mass % or more (in particular, 90 mass % to 100 mass %), and most preferably 100 mass % (chloroprene rubber only). When the first rubber component contains the ethylene-α-olefin elastomer, a proportion of the ethylene-α-olefin elastomer in the first rubber component is the same as the proportion of the chloroprene rubber.

(A2) First Short Fiber

The rubber composition forming the compression rubber layer main body may further contain a first short fiber. Examples of the first short fiber include a synthetic short fiber such as a polyamide short fiber (such as an aliphatic polyamide short fiber such as a polyamide 6 short fiber, a polyamide 66 short fiber, and a polyamide 46 short fiber, an aramid short fiber), a polyalkylene arylate short fiber (for example, a polyethylene terephthalate (PET) short fiber and a polyethylene naphthalate short fiber), a liquid crystal polyester short fiber, a polyarylate short fiber (such as an amorphous wholly aromatic polyester short fiber), a vinylon short fiber, a polyvinyl alcohol short fiber, and a polyparaphenylene benzobisoxazole (PBO) short fiber; a natural short fiber such as cotton, hemp, and wool; and an inorganic short fiber such as a carbon short fiber. Those first short fibers may be used alone or in combination of two or more kinds thereof. Among those, the aramid short fiber and the PBO short fiber are preferred, and the aramid short fiber is particularly preferred.

The first short fiber may be a short fiber obtained by cutting a fiber stretched into a fibrous form to a predetermined length. The first short fiber is preferably embedded in the compression rubber layer main body in a state of being oriented in the belt width direction in order to prevent compression deformation of the belt against a lateral pressure from the pulley (to increase the lateral pressure resistance). Since the friction coefficient of the surface in contact with the pulley can be reduced to prevent noise (sound) and wear due to friction with the pulley can be reduced, it is preferable to make the short fiber protrude from the surface of the compression rubber layer main body.

An average fiber length of the first short fiber is, for example, 0.1 mm to 20 mm, preferably 0.5 mm to 15 mm (for example, 0.5 mm to 10 mm), and more preferably 1 mm to 6 mm (in particular, 2 mm to 4 mm) from a viewpoint of improving the lateral pressure resistance and the abrasion resistance without decreasing the bendability. If a fiber length of the first short fiber is too short, mechanical properties in a grain direction cannot be sufficiently improved, and the lateral pressure resistance and the abrasion resistance may decrease. Conversely, if the fiber length is too long, the orientation of the short fiber in the rubber composition may decrease, which may decrease the bendability.

A single yarn fineness of the first short fiber is, for example, 1 dtex to 12 dtex, preferably 1.2 dtex to 10 dtex (for example, 1.5 dtex to 8 dtex), and more preferably 2 dtex to 5 dtex (in particular, 2 dtex to 3 dtex) from a viewpoint of being capable of providing a high reinforcing effect without decreasing the bendability. If the single yarn fineness is too large, the lateral pressure resistance and the abrasion resistance per compounding amount may decrease, and if the single yarn fineness is too small, the bendability may decrease due to a decrease in dispersibility in rubber.

The first short fiber may be subjected to a general-purpose adhesion treatment to enhance an adhesive strength with the first rubber component. Examples of such an adhesion treatment include a method of immersing the first short fiber in a treatment liquid containing an epoxy compound or a polyisocyanate compound, a method of immersing the first short fiber in an RFL treatment liquid containing resorcin, formaldehyde, and latex, and a method of immersing the first short fiber in rubber cement. Those treatments may be applied alone or in combination of two or more kinds thereof.

A proportion of the first short fiber is, for example, 5 parts by mass to 50 parts by mass, preferably 5 parts by mass to 40 parts by mass (for example, 8 parts by mass to 35 parts by mass), more preferably 10 parts by mass to 30 parts by mass, and still more preferably 15 parts by mass to 25 parts by mass with respect to 100 parts by mass of the first rubber component. If an amount of the first short fibers is too small, the lateral pressure resistance and the abrasion resistance may decrease, and if the amount is too large, workability may decrease, or the bendability of the belt may decrease, which may decrease the durability.

(A3) Other Components

The rubber composition forming the compression rubber layer main body may contain a commonly-used additive. Examples of the additive include a crosslinking agent or a vulcanizing agent (such as a sulfur-based crosslinking agent and an organic peroxide), a co-crosslinking agent (such as bismaleimides), a crosslinking aid or a crosslinking accelerator (such as a thiuram accelerator), a crosslinking retardant, a metal oxide (such as a zinc oxide, a magnesium oxide, a calcium oxide, a barium oxide, an iron oxide, a copper oxide, a titanium oxide, and an aluminum oxide), a filler [such as a reinforcing agent (reinforcing filler) such as carbon black and silicon oxide (such as hydrated silica); and an extender (a non-reinforcing filler or an inert filler) such as clay, calcium carbonate, talc, and mica], a plasticizer (or a softener) [such as oils (such as paraffin oil and naphthenic oil), an aliphatic carboxylic acid plasticizer, an aromatic carboxylic acid ester plasticizer, an oxycarboxylic acid ester plasticizer, a phosphate ester plasticizer, an ether plasticizer, and an ether ester plasticizer], a processing agent or a processing aid (such as stearic acid, metal stearate, wax, paraffin, and fatty acid amide), an anti-aging agent (such as an antioxidant, a thermal anti-aging agent, an anti-flex cracking agent, and an antiozonant), an adhesiveness improver, a colorant, a tackifier, a coupling agent (such as a silane coupling agent), a stabilizer (such as an ultraviolet absorber and a thermostabilizer), a flame retardant, and an antistatic agent. Those additives may be used alone or in combination of two or more kinds thereof. The metal oxide may act as a crosslinking agent.

A proportion of the filler (first filler) such as carbon black or silica is, for example, 10 parts by mass to 200 parts by mass, preferably 20 parts by mass to 100 parts by mass, more preferably 30 parts by mass to 80 parts by mass, and still more preferably 40 parts by mass to 70 parts by mass with respect to 100 parts by mass of the first rubber component.

A proportion of the plasticizer (first plasticizer) may be 10 parts by mass or less, for example, 0.1 parts by mass to 10 parts by mass, preferably 1 part by mass to 8 parts by mass, and more preferably 3 parts by mass to 7 parts by mass with respect to 100 parts by mass of the first rubber component. If the proportion of the plasticizer is too high, the compression rubber layer may become too soft, which may decrease the lateral pressure resistance.

A total proportion of the other components (A3) is, for example, 5 parts by mass to 300 parts by mass, preferably 10 parts by mass to 200 parts by mass, more preferably 30 parts by mass to 150 parts by mass, and still more preferably 50 parts by mass to 100 parts by mass with respect to 100 parts by mass of the first rubber component.

(A4) Properties of Compression Rubber Layer Main Body

The compression rubber layer main body has high rubber hardness because a rubber composition with high rigidity (high elastic modulus) is used to obtain the lateral pressure resistance. The rubber hardness may be 89° or more, for example, 90° to 99°, preferably 91° to 98°, more preferably 92° to 97°, and still more preferably 93° to 96°. If the rubber hardness of the compression rubber layer main body is too low, the lateral pressure resistance may decrease, and if the rubber hardness is too high, the bending fatigue resistance and the durability may decrease.

In the present application, the rubber hardness of each rubber layer indicates a value Hs (type A) measured using a type A durometer in accordance with a spring type durometer hardness test specified in JIS K6253 (2012) (vulcanized rubber and thermoplastic rubber-hardness determining method-), and may be simply referred to as the rubber hardness. Specifically, measurement can be performed by a method described in Examples to be described later.

A tensile strength of the compression rubber layer main body is, for example, 25 MPa to 50 MPa, preferably 30 MPa to 40 MPa, and more preferably about 30 MPa to 35 MPa in the belt width direction. If the tensile strength is too small, the lateral pressure resistance may decrease. Conversely, if the tensile strength is too large, the bending fatigue resistance may decrease.

In the present application, regarding the tensile strength of each rubber layer, a value of a tensile strength T of each rubber layer that can be measured by a method in accordance with JIS K6251 (2017) is used as an index value of the tensile strength. Specifically, measurement can be performed by a method described in Examples to be described later.

The friction coefficient of the surface of the compression rubber layer main body may be less than 0.40, and for example, is 0.20 or more and less than 0.40, preferably 0.30 to 0.39, and more preferably 0.32 to 0.38. If the friction coefficient of the surface of the compression rubber layer main body is too small, a power-transmission efficiency may decrease. Conversely, if the friction coefficient is too large, problems such as abnormal noise and sticking and scattering of rubber may occur.

In the present application, the friction coefficients (average friction coefficients) of the compression rubber layer main body and the inner surface layer can be calculated by winding a cut belt around a flat pulley at an angle of 90° and measuring the frictional force (load) when the inner circumferential surface of the bel comes into contact with the outer circumferential surface of the flat pulley and moves, and specifically, the measurement can be performed by a method described in Examples to be described later.

In the present application, the friction coefficient of the surface of the compression rubber layer main body means the friction coefficient of the surface of the compression rubber layer main body that is not covered with the inner surface layer, and means the friction coefficient of the raw edge cogged V-belt of the present invention in a form in which the inner surface layer is not covered.

An average thickness of the compression rubber layer main body can be appropriately selected depending on the type of belt, and is, for example, 4 mm to 13 mm, preferably 5 mm to 12 mm, more preferably 6 mm to 11 mm, still more preferably 7 mm to 10 mm, and most preferably 7.5 mm to 9 mm. In the present application, the thickness of the compression rubber layer main body means a thickness of the top portion of the cog portion.

(Inner Surface Layer of Compression Rubber Layer)

In the present invention, the belt inner circumferential surface of the compression rubber layer main body is covered with a surface layer (inner surface layer). A reason for forming the inner surface layer in the present invention is as follows.

That is, when a raw edge V-belt, not limited to a variable speed belt, is wound around pulleys, only V-shaped two side surfaces come into contact with the pulleys, and the inner circumferential surface (bottom surface, lower surface) does not come into contact with the pulleys, or even if the inner circumferential surface comes into contact with the pulleys, only light contact occurs. Therefore, in most uses, the frictional force is not required on the inner circumferential surface of the raw edge V-belt. In contrast, as described above, in the use related to the variable speed belt of the belt clutch-in type CVT, the inner circumferential surface of the raw edge V-belt is used not only in contact with the pulley (pulley shaft portion) but also exerts a pressing force on the pulley (pulley shaft portion), which serves as the braking function, and the performance is greatly affected by the frictional force of the inner circumferential surface of the raw edge V-belt. Therefore, the matter that the frictional force is required on the inner circumferential surface of the raw edge V-belt itself is a special circumstance. In this regard, Patent Literatures 1 to 6 described above only disclose an idea of making the belt inner circumferential surface slippery (lowering friction coefficient), and an opposite idea of requiring the frictional force on the belt inner circumferential surface (increasing friction coefficient) is unique (unexpected) with respect to the related art. That is, in the related art, the inner circumferential surface is preferably made of fabric (no rubber is disposed) to reduce the friction coefficient, whereas the present invention is characterized by an aspect in which a rubber layer (rubber composition with high friction coefficient) is disposed on the inner circumferential surface.

Specifically, in the present invention, the friction coefficient of the surface of the inner surface layer is made larger than the friction coefficient of the surface of the compression rubber layer main body. A method for adjusting the friction coefficient of the inner surface layer may be performed by adjusting components of the rubber composition forming the inner surface layer. However, as described above, in the case of the raw edge cogged V-belt, achieving both the lateral pressure resistance and the improvement of the braking performance is difficult. Therefore, in the present invention, the rubber composition is adjusted from the following viewpoints, taking into consideration the properties of the raw edge cogged V-belt.

That is, while there is a demand in the raw edge V-belt for increasing the thickness of the entire belt from a viewpoint of improving the lateral pressure resistance and the power-transmission ability, there is also a demand for maintaining good bendability by, for example, reducing the thickness of the entire belt from a viewpoint of improving the bending fatigue resistance and the power-transmission efficiency. The raw edge cogged V-belt can satisfy these two demands which are in conflicts by providing a cog in the raw edge V-belt. That is, in the raw edge cogged V-belt, the cog ridge increases a friction power-transmission surface to improve the lateral pressure resistance and the power-transmission ability, while the cog valley is designed to maintain the good bendability, and when the raw edge cogged V-belt is wound around the pulleys, the bending of the cog valley is greater than the bending of the cog ridge. Therefore, fatigue of the compression rubber layer that is repeatedly bent in the cog valley increases, and cracks are more likely to occur in the compression rubber layer in the cog valley than in the cog ridge.

The inner circumferential surface of the raw edge cogged V-belt is formed with the cog portion in which the cog ridge and the cog valley are arranged alternately, but in the present use, only the top portion of the inner circumferential cog ridge comes into contact with the pulley shaft portion. The inner surface layer with a high friction coefficient may be disposed only on the top portion of the inner circumferential cog ridge, but in consideration of the productivity, it is preferable to dispose the inner surface layer as a continuous layer that continuously connects the inner circumferential cog ridge and the inner circumferential cog valley. When a continuous layer is formed, the rubber composition that forms the inner surface layer also affects the cracks (bending fatigue resistance) of the cog valley. Furthermore, increasing the thickness of the inner surface layer in the compression rubber layer reduces the proportion of the main body, and thus the rigidity (lateral pressure resistance) of the entire compression rubber layer is also affected. That is, while the inner surface layer has a function of improving the braking performance (high frictional force) of the belt inner circumferential surface, the inner surface layer also affects the decreases in the lateral pressure resistance and the bending fatigue resistance of the belt. Therefore, it is necessary to add, to the rubber composition forming the inner surface layer, the braking function (high friction coefficient) of the inner circumferential cog ridge while ensuring the lateral pressure resistance and the bending fatigue resistance. From this viewpoint, in the present invention, in adjusting the rubber composition, it is more preferable to adjust the friction coefficient of the surface of the inner surface layer to be higher than the friction coefficient of the surface of the compression rubber layer main body, and further adjust magnitude of the friction coefficient and/or the thickness of the inner surface layer.

From this viewpoint, the inner surface layer may be formed of a rubber composition (crosslinked rubber composition) containing a second rubber component. Furthermore, in the present invention, by adjusting the combination of the compression rubber layer main body and the inner surface layer in addition to the magnitude of the friction coefficient and/or the thickness of the inner surface layer, the braking performance (high frictional force) of the belt inner circumferential surface can be improved while maintaining the heat resistance, the lateral pressure resistance, and the bending fatigue resistance required for a variable speed belt.

(B1) Second Rubber Component

The second rubber component can be selected from the rubber components exemplified as the first rubber component, including preferred aspects. The second rubber component may be a rubber component different from the first rubber component, but is usually the same as the first rubber component.

(B2) Other Components and Component for Increasing Friction Coefficient

The rubber composition forming the inner surface layer may further contain other components. As the other components, the components exemplified as the other components (A3) in the compression rubber layer main body can be used.

It is sufficient that the rubber composition forming the inner surface layer has a higher friction coefficient than that of the rubber composition forming the compression rubber layer main body, but a method for increasing the friction coefficient is not particularly limited. The components exemplified as other components (A3) may be used as friction coefficient adjusting agents to increase viscosity of the rubber composition to adjust the friction coefficient. Examples of the friction coefficient adjusting agents include plasticizers, adhesiveness improvers, and tackifiers.

Examples of the plasticizer (second plasticizer) include oils (such as paraffin oil and naphthenic oil), an aliphatic carboxylic acid plasticizer (such as an adipic acid ester plasticizer and a sebacic acid ester plasticizer), an aromatic carboxylic acid ester plasticizer (such as a phthalic acid ester plasticizer and a trimellitic acid ester plasticizer), an oxy-carboxylic acid ester plasticizer, a phosphate ester plasticizer, an ether plasticizer (such as a polyoxyalkylene glycol such as polyethylene glycol, polypropylene glycol, and polytetramethylene glycol), and an ether ester plasticizer [such as a poly $C_{2-4}$ alkylene glycol di-$C_{2-18}$ fatty acid ester such as a polyethylene glycol dibutanoic acid ester, a polyethylene glycol diisobutanoic acid ester, a polyethylene glycol di-2-ethylbutanoic acid ester, a polyethylene glycol di-2-ethylhexanoic acid ester, and a polyethylene glycol didecanoic acid ester; a poly $C_{2-4}$ alkylene oxide adduct of a $C_{2-12}$ aliphatic dicarboxylic acid such as a polyethylene oxide adduct of adipic acid; and a $C_{2-12}$ aliphatic dicarboxylic acid di($C_{1-12}$ alkoxy $C_{2-4}$ alkyl) ester such as a mono or di(butoxyethyl) adipic acid ester, a di(2-ethylhexyloxyethyl) adipic acid ester, and a di(octoxyethyl) adipic acid ester]. Those plasticizers may be used alone or in combination of two or more kinds thereof.

Examples of the adhesiveness improver include a resorcinol-formaldehyde co-condensate (RF condensate), and an amino resin [condensate of a nitrogen-containing cyclic compound and formaldehyde, for example, a melamine resin such as hexamethylol melamine and hexaalkoxymethyl melamine (such as hexamethoxymethyl melamine and hexabutoxymethyl melamine), a urea resin such as methylol urea, and a benzoguanamine resin such as a methylol benzoguanamine resin]. Those adhesiveness improvers may be used alone or in combination of two or more kinds thereof.

Examples of the tackifier include a terpene resin, a rosin resin such as natural rosin and modified rosin, a petroleum resin, and a modified olefin polymer. Those tackifiers may be used alone or in combination of two or more kinds thereof.

Among those friction coefficient adjusting agents, the plasticizer such as the ether plasticizer and the ether ester plasticizer are preferred, and the ether ester plasticizer is particularly preferred. The ether ester plasticizer may be a poly $C_{2-4}$ alkylene glycol di-$C_{4-12}$ fatty acid ester such as the polyethylene glycol di-2-ethylhexanoic acid ester.

A proportion of the friction coefficient adjusting agent (in particular, second plasticizer) is, for example, 1 part by mass to 30 parts by mass, preferably 3 parts by mass to 20 parts by mass, and more preferably 10 parts by mass to 20 parts by mass with respect to 100 parts by mass of the second rubber component. If the proportion of the friction coefficient adjusting agent is too small, the effect of increasing the friction coefficient is small, and if the proportion is too large, the compression rubber layer may become too soft and the lateral pressure resistance may decrease.

A proportion of the filler (second filler) such as carbon black is, for example, 10 parts by mass to 200 parts by mass, preferably 20 parts by mass to 100 parts by mass, more preferably 30 parts by mass to 100 parts by mass, and still more preferably 40 parts by mass to 70 parts by mass with respect to 100 parts by mass of the first rubber component.

A total proportion of the other components (B2) is, for example, 5 parts by mass to 300 parts by mass, preferably 10 parts by mass to 200 parts by mass, more preferably 30 parts by mass to 150 parts by mass, and still more preferably 50 parts by mass to 100 parts by mass with respect to 100 parts by mass of the second rubber component.

Since the short fiber is a component that decreases the friction coefficient, it is preferable that the rubber composition forming the inner surface layer does not substantially contain the short fiber, and it is particularly preferable that the rubber composition does not contain the short fiber.
(B3) Properties of Inner Surface Layer The friction coefficient of the surface of the inner surface layer of the compression rubber layer can be selected from a range of about 0.35 to 0.75, and is for example, 0.40 to 0.70 (in particular, 0.45 to 0.58), preferably 0.50 to 0.60, and more preferably 0.53 to 0.60. The friction coefficient may be 0.40 or more. The rubber composition forming the inner surface layer is formed of a composition that does not contain the short fiber, so that the friction coefficient may be adjusted to 0.40 or more, preferably 0.45 or more, and more preferably 0.50 or more. If the friction coefficient of the inner surface layer is too small, the braking performance may be insufficient, and if the friction coefficient is too large, problems such as abnormal noise and sticking and scattering of rubber may occur.

In the present application, the friction coefficient can be measured by the method described in Examples to be described later.

A difference in the friction coefficients between the compression rubber layer main body and the inner surface layer (friction coefficient of surface of inner surface layer-friction coefficient of surface of main body) may be 0.03 or more, and for example, is 0.05 to 0.3, preferably 0.1 to 0.27, more preferably 0.12 to 0.25, still more preferably 0.13 to 0.22, and most preferably 0.15 to 0.2. If the difference in the friction coefficients between the inner surface layer and the main body is too small, the braking performance may decrease. Conversely, if the difference in the friction coefficients is too large, problems such as abnormal noise and sticking and scattering of rubber may occur.

The rubber hardness of the inner surface layer of the compression rubber layer may be 85° or less, preferably 82° or less, and more preferably 80° or less, and can be selected from a range of, for example, about 40° to 85° (in particular, 50° to) 80°, and for example, is 51° to 80° (for example, 51° to) 70°, preferably 52° to 80° (for example, 52° to) 60°, more preferably 60° to 79°, still more preferably 70° to 78°, and most preferably 73° to 77°. If the rubber hardness of the inner surface layer is too small, the lateral pressure resistance may be insufficient, and if the rubber hardness is too large, the bending fatigue resistance may be insufficient.

A difference in the rubber hardness between the compression rubber layer main body and the inner surface layer (rubber hardness of main body-rubber hardness of inner surface layer) is, for example, 10° to 50°, preferably 12° to 45°, and more preferably 15° to 40°. If the difference in the rubber hardness between the main body and the inner surface layer is too small, the bending fatigue resistance may decrease. Conversely, if the difference in the rubber hardness is too large, the lateral pressure resistance may decrease.

A tensile strength of the inner surface layer of the compression rubber layer is, for example, 10 MPa to 25 MPa, preferably 11 MPa to 20 MPa, and more preferably 12 MPa to 15 MPa. If the tensile strength is too small, the lateral pressure resistance may be insufficient, and if the tensile strength is too large, the bending fatigue resistance may be insufficient.

A difference in the tensile strengths between the compression rubber layer main body and the inner surface layer (tensile strength of main body-tensile strength of inner surface layer) is, for example, 5 MPa to 30 MPa, preferably 10 MPa to 25 MPa, and more preferably 15 MPa to 20 MPa. If the difference in the tensile strength between the main body and the inner surface layer is too small, the bending fatigue resistance may decrease. Conversely, if the difference in the tensile strength is too large, the lateral pressure resistance may decrease.

The thickness of the inner surface layer is preferably adjusted to an appropriate thickness of the inner surface layer that provides high braking performance while maintaining the lateral pressure resistance and the bending fatigue resistance. Specifically, the average thickness of the inner surface layer is 0.2 mm to 2.5 mm, preferably 0.3 mm to 2 mm (for example, 0.5 mm to 2 mm), more preferably 0.3 mm to 1.5 mm, still more preferably 0.4 mm to 1.2 mm, and most preferably 0.5 mm to 1 mm. If the thickness of the inner surface layer is too small, the inner surface layer may wear out early and the persistence of the braking performance may be insufficient. If the thickness of the inner surface layer is too large, the proportion of the compression rubber layer main body may decrease, and the lateral pressure resistance may be insufficient. That is, the range described above is an appropriate range that provides high braking performance (persistence) while maintaining the lateral pressure resistance. The thickness of the inner surface layer must be within the range of the center-valley thickness H3 due to the structure of the raw edge cogged V-belt.

The average thickness of the inner surface layer can be measured using a microscope, and specifically, the measurement can be performed by a method described in Examples to be described later.

The average thickness of the inner surface layer is, for example, 1% to 19%, and preferably 3% to 13% of the average thickness of the entire belt. The average thickness of the inner surface layer is, for example, 1% to 25%, preferably 3% to 20%, more preferably 4% to 15%, and still more preferably 5% to 10% of the average thickness of the compression rubber layer (total of main body and inner surface layer).

[Tension Rubber Layer]

The raw edge cogged V-belt of the present invention may further include the tension rubber layer formed of a rubber composition (crosslinked rubber composition) containing a third rubber component.

The third rubber component can be selected from the rubber components exemplified as the first rubber component, including preferred aspects. The third rubber component may be a rubber component different from the first rubber component, but is usually the same as the first rubber component.

The rubber composition forming the tension rubber layer also preferably contains a second short fiber from a viewpoint of further improving the lateral pressure resistance and the abrasion resistance. If the tension rubber layer as well as the compression rubber layer main body contain the second short fiber as the short fiber, the lateral pressure resistance and the abrasion resistance are further improved. The second short fiber can be selected from the short fibers exemplified as the first short fiber, including the preferred aspect. The second short fiber may be a short fiber different from the first short fiber, but is usually the same as the first short fiber. A proportion of the second short fiber can be selected from the proportion of the first short fiber, including the preferred proportion.

The rubber composition forming the tension rubber layer may further contain other components exemplified in the rubber composition forming the compression rubber layer main body.

Properties of the tension rubber layer can be selected from the properties (such as a hardness, a tensile strength, a friction coefficient) of the compression rubber layer main body described above, including the preferred ranges.

[Tension Member Layer]

The tension member layer may include a tension member, and may be a tension member layer formed only of a tension member, but it is preferable that the tension member layer is a tension member layer (adhesion rubber layer) formed of a crosslinked rubber composition in which the tension member is embedded from a viewpoint of preventing peeling between layers and improving the durability of the belt. The adhesion rubber layer is interposed between the tension rubber layer and the compression rubber layer main body to adhere the tension rubber layer and the compression rubber layer main body, and the tension member is embedded in the adhesion rubber layer.

(Adhesion Rubber Layer)

The raw edge cogged V-belt of the present invention may further include the adhesion rubber layer formed of a cured product (crosslinked rubber composition) of a rubber composition containing a fourth rubber component.

The fourth rubber component can be selected from the rubber components exemplified as the first rubber component, including preferred aspects. The fourth rubber component may be a rubber component different from the first rubber component, but is usually the same as the first rubber component.

The rubber composition forming the adhesion rubber layer may further contain the short fibers or other components exemplified in the rubber composition forming the compression rubber layer main body.

The adhesion rubber layer preferably has rubber hardness lower than that of the compression rubber layer main body. The rubber hardness of the adhesion rubber layer is, for example, 60° to 85°, preferably 65° to 84°, more preferably 70° to 83°, and still more preferably 75° to 82°. If the rubber hardness is too small, the lateral pressure resistance may be insufficient, and if the rubber hardness is too large, adhesiveness may decrease. By adjusting the adhesion rubber layer to such low hardness, it becomes possible to greatly deform when shear stress acts, and the tension member can be prevented from peeling off from the compression rubber layer main body and the tension rubber layer.

An average thickness of the adhesion rubber layer is, for example, 0.8 mm to 3 mm, preferably 1.2 mm to 2.8 mm, and still more preferably 1.5 mm to 2 mm.

(Tension Member)

The tension member is not particularly limited, and cord (twisted cord) arranged at a predetermined interval in the belt width direction can be usually used. The cords are arranged in the belt longitudinal direction, and although a plurality of cords may be arranged parallel to the belt longitudinal direction, from the viewpoint of productivity, the cords are usually arranged in parallel in a spiral shape, extending substantially parallel to the belt longitudinal direction of the raw edge cogged V-belt at a predetermined pitch. In the case of the spiral arrangement, an angle of a cord 18 with respect to the belt longitudinal direction may be, for example, 5° or less, and it is more preferable that the angle is closer to 0° from a viewpoint of belt running performance. The pitch of the cords is preferably set in a range of 1.5 mm to 2.5 mm, and more preferably in a range of 1.8 mm to 2.2 mm.

It is sufficient that at least a part of the cord is in contact with the adhesion rubber layer, and the cord may be in any form of a form in which the cord is embedded in the adhesion rubber layer, a form in which the cord is embedded between the adhesion rubber layer and the tension rubber layer, and a form in which the cord is embedded between the adhesion rubber layer and the compression rubber layer. Among these, the form in which the cord is embedded in the adhesion rubber layer is preferable from the viewpoint of improving the durability.

Examples of the fiber constituting the cord include the same fiber as the short fiber. Among the fibers, a synthetic fiber such as a polyester fiber (polyalkylene arylate fiber) having $C_{2-4}$ alkylene-$C_{6-12}$ allylate such as ethylene terephthalate and ethylene-2,6-naphthalate as a main structural unit and an aramid fiber, an inorganic fiber such as a carbon fiber, and the like are widely used from the viewpoint of high modulus, and the polyester fiber (such as a polyethylene terephthalate fiber and a polyethylene naphthalate fiber) and the aramid fiber are preferable. The fiber may be a multi-filament yarn. The multifilament yarn may contain mono-filament yarns of, for example, 100 filaments to 5000 filaments, preferably 500 filaments to 4000 filaments, and more preferably 1000 filaments to 3000 filaments.

As the cord, generally, a twisted cord including a multi-filament yarn (for example, a piled cord, a single twisted cord or Lang twisted cord) can be used. An average wire diameter of the cord (diameter of the twisted cord) may be, for example, about 0.5 mm to 3 mm, preferably about 0.6 mm to 2 mm, and more preferably about 0.7 mm to 1.5 mm. The total fineness of the cord (twisted cord) may be, for example, 2000 dtex to 17000 dtex, preferably 4000 dtex to 15000 dtex, and more preferably 5000 dtex to 13000 dtex (in particular, about 6000 dtex to 8000 dtex).

In order to improve the adhesiveness to the rubber component, the cord may be subjected to an adhesion treatment (or surface treatment) in the same manner as the short fibers. The cord is preferably subjected to the adhesion treatment with at least the RFL liquid.

[Reinforcing Fabric]

The raw edge cogged V-belt of the present invention may include a reinforcing fabric. Examples of a form of the reinforcing fabric include a form in which the reinforcing fabric is laminated on an outer circumferential surface of the tension rubber layer, a form in which the reinforcing fabric is embedded in the compression rubber layer main body and/or the tension rubber layer, and a form in which the reinforcing fabric is embedded between the compression rubber layer main body and the inner surface layer.

The reinforcing fabric can be formed by, for example, a fabric material (in particular, woven fabric) such as a woven fabric, a wide-angle canvas fabric, a knitted fabric, or a non-woven fabric, and if necessary, the reinforcing fabric may be laminated on or embedded in the compression rubber layer and/or the tension rubber layer in the above forms after the adhesion treatment, for example, treatment with an RFL liquid (such as immersion treatment), friction treatment in which an adhesion rubber is rubbed into the fabric material, or lamination of the adhesion rubber and the fabric material.

[Method for Producing Raw Edge Cogged V-Belt]

A method for producing the raw edge cogged V-belt of the present invention is not particularly limited, and for a lamination process of each layer (a method for producing a belt sleeve), a commonly-used method can be used depending on the type of belt.

For example, a typical method for producing a raw edge cogged V-belt will be described below. First, a laminated body including an inner surface layer sheet (uncrosslinked rubber sheet) of the compression rubber layer and a compression rubber layer main body sheet (uncrosslinked rubber sheet) is disposed in such a manner that the inner surface layer sheet is in contact with a flat cogged mold in which tooth portions and groove portions corresponding to the inner circumferential cog portions are alternately arranged, and is pressed at a temperature of 60° C. to 120° C. (in particular, 80° C. to 100° C.) to produce a cog pad having a cog portion molded (pad which is not completely crosslinked and is in a semi-crosslinked state). Then, both ends of the cog pad may be cut perpendicularly from an appropriate position (in particular, top portion of cog ridge portion). Next, an outer circumference of a cylindrical mold is covered with an inner mother mold having tooth portions and groove portions alternately arranged, the cog pad is wound by engaging with the tooth portions and the groove portions of the inner mother mold to joint at the both ends (in particular, top of cog ridge portion), a second adhesion rubber layer sheet (lower adhesion rubber: uncrosslinked rubber sheet) may be laminated on the outer circumference of the cog pad, and then the cord (twisted cord) for forming the tension member may be spun spirally, and a first adhesion rubber layer sheet (upper adhesion rubber: uncrosslinked rubber sheet) and a tension rubber layer sheet (uncrosslinked rubber sheet) may be sequentially wound on the outer circumference thereof to produce an uncrosslinked molded product.

Thereafter, the uncrosslinked molded product is covered with a jacket and placed in a well-known crosslinking device (such as a vulcanization can), and crosslinking molding is conducted at a temperature of 120° C. to 200° C. (in particular, 150° C. to 180° C.) to produce a crosslinked belt sleeve. Then, a cutter or the like is used to cut the crosslinked belt sleeve into a V shape to obtain an endless raw edge cogged V-belt.

In a case of a raw edge double cogged V-belt, while the outer circumference of the uncrosslinked molded product is covered with an outer mother mold having tooth portions and groove portions corresponding to the outer circumferential cog portions alternately arranged, the outer circumference is covered with a jacket, and crosslinking is conducted to obtain a crosslinked belt sleeve with a cog portion formed on an outer circumferential surface, and the crosslinked belt sleeve is cut into a V shape to obtain the raw edge double cogged V-belt.

The adhesion rubber layer can be formed by a plurality of adhesion rubber layer sheets, and the cord (twisted cord) that forms the tension member may be spun in association with the laminating order of the plurality of adhesion rubber layer sheets depending on a position of embedding in the adhesion rubber layer.

EXAMPLES

Hereinafter, the present invention will be described in more detail based on Examples, but the present invention is not limited to these Examples. Details of materials used in Examples, a method for producing the uncrosslinked rubber sheet, and a method for measuring or evaluating each of physical properties are shown below.

[Used Materials]

Chloroprene rubber: "PM-40" manufactured by DENKA Co., Ltd.

Magnesium oxide: "KyowaMag 30" manufactured by Kyowa Chemical Industry Co., Ltd.

Stearic acid: "Stearic acid TSUBAKI" manufactured by NOF Corporation

Anti-aging agent: "Nonflex OD-3" manufactured by Seiko Chemical Co., Ltd.

Carbon black: "Seast 3" manufactured by Tokai Carbon Co., Ltd.

Silica: "ULTRASIL (registered trademark) VN3" manufactured by Evonik Japan Co., Ltd., BET specific surface area: 175 m²/g Plasticizer 1: naphthenic oil, "NS-900" manufactured by Idemitsu Kosan Co., Ltd.

Plasticizer 2: "RS-700" manufactured by ADEKA Co., Ltd.

Crosslinking accelerator: tetramethylthiuram disulfide ("Nocceler TT" manufactured by Ouchi Shinko Chemical Industrial Co., Ltd.)

Zinc oxide: "Zinc oxide third grade" manufactured by Seido Chemical Industry Co., Ltd.

Sulfur: "Sulfur" manufactured by Miwon Chemical Co., Ltd.

N,N'-m-phenylene dimaleimide: "Vulnoc PM" manufactured by Ouchi Shinko Chemical Industrial Co., Ltd.

Resorcin-formalin copolymer (resorcinol resin): resorcin-formalin copolymer with less than 20% resorcinol by mass and less than 0.1% formalin by mass Hexamethoxy methylol melamine: "POWERPLAST PP-1890S" manufactured by Singh Plasticisers & Resins Pvt. Ltd.

Aramid short fiber: "Conex short fiber" manufactured by Teijin Co., Ltd., short fiber with an average fiber length of 3 mm, an average fiber diameter of 14 μm, an adhesion rate of a solid content of 6 mass % subjected to an adhesion treatment with an RFL liquid (resorcin: 2.6 parts by mass, 37% formalin: 1.4 parts by mass, vinylpyridine-styrene-butadiene copolymer latex (manufactured by Zeon Corporation, Japan): 17.2 parts by mass, water: 78.8 parts by mass)

Cord: treated cord (cord diameter 1.28 mm) obtained by performing an adhesion treatment on a twisted cord having total fineness of 6600 dtex in which aramid fibers having fineness of 1100 dtex are twisted in a configuration of 2×3 to obtain an organzine at a primary twist coefficient of 3.0 and a secondary twist coefficient of 3.0

Reinforcing fabric: 2/2 twill nylon canvas fabric (thickness: 0.30 mm to 0.50 mm) subjected to an adhesion treatment with an RFL liquid.

[Production of Uncrosslinked Rubber Sheet for Rubber Layer]

The rubber compositions for forming the compression rubber layer (main body, inner surface layer), the tension rubber layer, and the adhesion rubber layer were prepared in compounding ratios shown in Tables 1 and 2 below. The rubber compositions for forming each layer were kneaded using a Banbury mixer, and the kneaded rubber obtained was passed through a calendar roll to produce a rolled rubber sheet (uncrosslinked rubber sheet). In the present application, the rubber compositions are denoted by R1 to R7, respectively.

TABLE 1

|  |  | Compression rubber layer main body and tension rubber layer R1 | Adhesion rubber layer R2 |
|---|---|---|---|
| Composition (part by mass) | Chloroprene rubber | 100 | 100 |
|  | Aramid short fiber | 20 | — |
|  | Plasticizer 1 | 5 | — |
|  | Plasticizer 2 | — | 5 |
|  | Magnesium oxide | 4 | 4 |
|  | Carbon black | 50 | 40 |
|  | Silica | — | 20 |
|  | Anti-aging agent | 4 | 4 |
|  | Zinc oxide | 5 | 5 |
|  | N, N'-m-phenylene dimaleimide | 3 | 2 |
|  | Stearic acid | 2 | 2 |
|  | Sulfur | 0.5 | — |
|  | Crosslinking accelerator | — | 1 |
|  | Resorcin-formalin copolymer | — | 1 |
|  | Hexamethoxy methylol melamine | — | 3 |
| Hardness Hs (type A) (°) |  | 93 | 82 |
| Tensile strength (MPa) [grain parallel direction] |  | 30.5 | 19.0 |

TABLE 2

|  |  | Inner surface layer | | | | |
|---|---|---|---|---|---|---|
|  |  | R3 | R4 | R5 | R6 | R7 |
| Composition (part by mass) | Chloroprene rubber | 100 | 100 | 100 | 100 | 100 |
|  | Aramid short fiber | — | — | — | — | 5 |
|  | Plasticizer 1 | — | — | — | — | 5 |
|  | Plasticizer 2 | 5 | 20 | 10 | 30 | — |
|  | Magnesium oxide | 4 | 4 | 4 | 4 | 4 |
|  | Carbon black | 40 | 50 | 50 | 40 | 40 |
|  | Silica | 20 | — | — | — | — |
|  | Anti-aging agent | 4 | 4 | 4 | 4 | 4 |
|  | Zinc oxide | 5 | 5 | 5 | 5 | 5 |

TABLE 2-continued

|  | Inner surface layer | | | | |
|---|---|---|---|---|---|
|  | R3 | R4 | R5 | R6 | R7 |
| N, N'-m-phenylene dimaleimide | 2 | — | — | — | — |
| Stearic acid | 2 | — | — | 1 | 2 |
| Sulfur | — | 1 | 1 | — | 0.5 |
| Crosslinking accelerator | 1 | 1 | 1 | 1 | — |
| Resorcin-formalin copolymer | 1 | — | — | — | — |
| Hexamethoxy methylol melamine | 3 | — | — | — | — |
| Hardness Hs (type A) (*) | 82 | 54 | 76 | 46 | 84 |
| Tensile strength (MPa) [grain parallel direction] | 19.0 | 12.3 | 14.5 | 11.5 | 23.0 |

[Rubber Hardness Hs of Crosslinked Rubber]

The uncrosslinked rubber sheet for each rubber layer was press-heated at a temperature of 160° C. for 30 minutes to produce a crosslinked rubber sheet (100 mm×100 mm×2 mm thickness). A laminate obtained by laminating three crosslinked rubber sheets was used as a sample, and hardness of the crosslinked rubber sheet was measured using a type A durometer in accordance with a spring type durometer hardness test specified in JIS K6253 (2012).

[Tensile Strength of Crosslinked Rubber]

A crosslinked rubber sheet produced for measuring the rubber hardness Hs of the crosslinked rubber was used as a sample, a test piece punched into a dumbbell shape (No. 5 shape) was produced in accordance with JIS K6251 (2017). In the sample containing the short fiber, a dumbbell-shaped test piece was collected such that an arrangement direction of the short fiber (grain direction) was a tensile direction. A value (tensile strength T) obtained by dividing, by an initial cross-sectional area of the test piece, a maximum tensile force recorded when both ends of the test piece were gripped by a chuck (grip) and the test piece was pulled at a speed of 500 mm/min until the test piece was cut was defined as a tensile strength.

[Production of Raw Edge Double Cogged V-Belt]

The method described in the above embodiment was used to produce a raw edge double cogged V-belt (size: top width 38.5 mm, V angle: 26 degrees, thickness (H1): 15.5 mm, cog height (inner circumferential side: H2): 6.8 mm, cog height (outer circumferential side: H5): 3.8 mm, pitch height (H4): 5.3 mm, center-valley thickness (H3): 3.4 mm, outer circumference length of belt: 1109 mm).

[Measurement of Thickness of Inner Surface Layer]

The raw edge double cogged V-belt was cut parallel to the belt width direction at the top portion of the cog, and the cross section thereof was observed with a microscope at 20 times magnification to measure a thickness of the inner surface layer. The thickness was measured at 5 points such that the belt was approximately divided into 5 equal parts in the length direction, and an arithmetic average of the thicknesses at the 5 points was taken as the thickness of the inner surface layer of the belt.

[Evaluation of V-Belt]

(1) Friction Coefficient of Belt Inner Circumferential Surface

Figure 7:
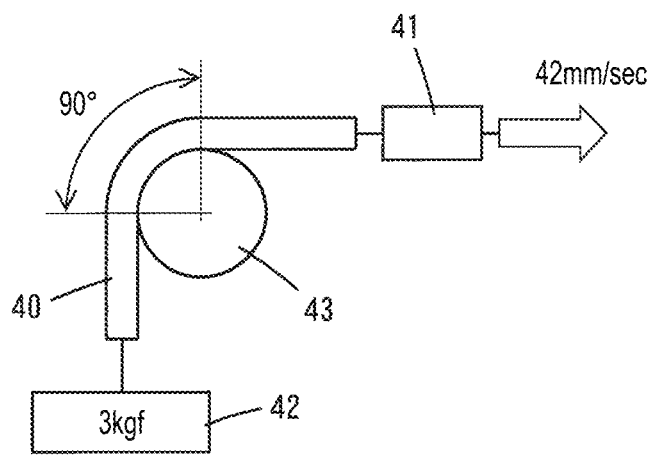
FIG. 7 is a schematic diagram illustrating a method for measuring a friction coefficient of an inner circumferential surface of the raw edge double cogged V-belt obtained in Example.

As illustrated in FIG. 7, one end of a belt test piece 40, which has ends due to cutting, was fixed to a load cell 41, and a load 42 of 3 kgf (test load Ts) was hung from the other end, and an inner circumferential surface of the belt test piece was disposed in contact with a flat pulley 43 (diameter: 47.6 mm, material: SUS304, surface roughness Ra: 1.6 μm in accordance with JIS B 0601) in such a manner that a winding angle θ was 90°. A load (measurement load Tt) detected from the load cell when the belt test piece 40 on a load cell 41 side was pulled at a speed of 42 mm/sec for about 15 seconds was read, and a static friction coefficient μ was calculated using the following formula (1). An average value of the static friction coefficients obtained from results of three measurements was taken as a friction coefficient (average friction coefficient) of the belt inner circumferential surface. The flat pulley was fixed so as not to rotate during the measurement.

$$\mu = \ln\left(Tt/Ts\right)/\theta \tag{1}$$

(In the formula, μ: static friction coefficient

Tt [N]: measurement load

Ts [N]: test load

θ [rad]: winding angle (contact angle)).

(2) Durability Running Test (Top Durability Test)

Figure 8:
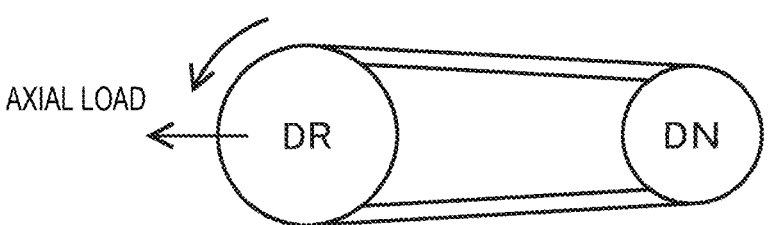
FIG. 8 is a diagram showing a layout of a testing machine used in a durability running test (Top durability test) of the raw edge double cogged V-belt obtained in Example.

As illustrated in FIG. 8, a biaxial running test machine including a driving (DR) pulley with a diameter (pitch diameter) of 178 mm and a driven (DN) pulley with a diameter (pitch diameter) of 140 mm was used to perform a test to confirm cog valley crack resistance (bending fatigue resistance). A raw edge double cogged V-belt was hung on each pulleys, and the driving pulley was rotated at 6,000 rpm, an axial load (dead weight) was 1.2 kN, and a load of 60 Nm was applied by a load device (power generation device) and then the belt was run at an ambient temperature of 115° C., and a running time until cracks generated in the cog valley reached the cord and the life was ended was measured as a running life.

(Determination Criteria for Durability Running Test (Top Durability Test))

a: running life is 130 hours or more (pass)

b: running life is 110 hours or more and less than 130 hours (pass)

c: running life is less than 110 hours (fail).

(3) Durability Running Test (Low Durability Test)

Figure 9:
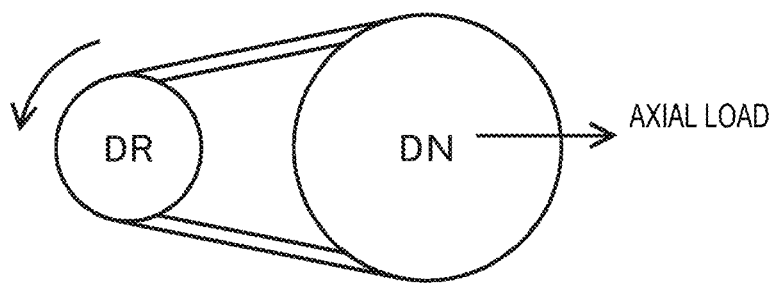
FIG. 9 is a diagram showing a layout of the testing machine used in the durability running test (Low durability test) of the raw edge double cogged V-belt obtained in Example.

As illustrated in FIG. 9, a biaxial running test machine including a driving (DR) pulley with a diameter (pitch diameter) of 92 mm and a driven (DN) pulley with a diameter (pitch diameter) of 208 mm was used to perform a test to confirm cord peeling resistance (lateral pressure resistance). A raw edge double cogged V-belt was hung on each pulleys, and the driving pulley was rotated at 5,000 rpm, an axial load (dead weight) was 2.2 kN, and a load of 50 Nm was applied by a load device (power generation device) and then the belt was run at an ambient temperature of 60° C., and a running time until peeling of the cord occurred was measured as a running life.

(Determination Criteria for Durability Running Test (Low Durability Test))

a: running life is 30 hours or more (pass)

b: running life is 10 hours or more but less than 30 hours (pass)

c: running life is less than 10 hours (fail)

(4) Braking Performance Test (Engine Braking Performance in Actual Vehicle)

A raw edge double cogged V-belt was attached to a CVT of a 1,000 cc all-terrain vehicle (off-road vehicle) and an actual vehicle test was conducted. A throttle was returned from a maximum speed while the vehicle was running, and a time until a rotation speed of the driven pulley dropped from 478 rpm to 0 rpm without applying a brake was measured.

(Determination Criteria for Braking Performance Test)

a: time until the rotation speed reaches 0 rpm is 7 seconds or less (pass)

b: time until the rotation speed reaches 0 rpm is more than 7 seconds but less than 8 seconds (pass)

c: time until the rotation speed reaches 0 rpm is more than 8 seconds (fail)

(5) Braking Persistence Test (Engine Braking Persistence in Actual Vehicle)

After the vehicle on which the braking performance test was performed was driven on a rough road (off-road) of 500 miles, the braking performance was confirmed using the method described in the braking performance test. The braking persistence was determined according to the following criteria from a viewpoint of whether the braking performance after 500 miles of running maintained the initial braking performance (before 500 miles of running) at high level or whether the level was decreased. If the braking performance test failed (determined as c), the braking persistence test was not performed.

(Determination Criteria for Braking Persistence Test)

a: braking performance before and after 500 miles of running are high level (maintained determination of a)

b: braking performance after 500 miles of running is determined as b (decreased from determination of a to determination of b, maintained as determination of b)

c: braking performance after 500 miles of running is determined as c (decreased from determination of a or b to determination of c).

(6) Comprehensive Determination

From the results of the durability running tests (Top durability test, Low durability test), the braking performance test, and the braking persistence test, a comprehensive superiority or inferiority was determined (ranked) according to the following criteria from a viewpoint of exhibiting the braking performance while ensuring the bending fatigue resistance (cog valley crack resistance) and lateral pressure resistance (cord peeling resistance) at a level required for the variable speed belt. From a viewpoint of practicality of a product, A, B, and C ranks were determined as pass, and a D rank was determined as fail.

TABLE 3

| Comprehensive determination | Engine braking performance | Engine braking persistence | Top durability | Low durability |
|---|---|---|---|---|
| Rank A | Determination of a | Determination of a | Determination of a | Determination of a |
| Rank B | Determination of a or b | Not including determination of c but including one determination of b | | |
| Rank C | Determination of a or b | Including one determination of c | | |
| | Determination of a or b | Not including determination of c but including two or more determinations of b | | |

TABLE 3-continued

| Comprehensive determination | Engine braking performance | Engine braking persistence | Top durability | Low durability |
|---|---|---|---|---|
| Rank D | Determination of a or b | Including two or more determinations of c | | |
| | Determination of c | | All determinations | |

Example 1

R1 was used for the tension rubber layer, R2 was used for the adhesion rubber layer, R1 was used for the compression rubber layer main body, and R4 was used for the inner surface layer of the compression rubber layer to produce a raw edge double cogged V-belt in which a compression rubber layer was a two-layer structure. In the obtained belt, a thickness of the compression rubber layer main body was 9.3 mm, and a thickness of the inner surface layer was 0.2 mm.

Example 2

A raw edge double cogged V-belt was produced in the same manner as in Example 1, except that the thickness of the compression rubber layer main body in the obtained belt was changed to 9.2 mm, and the thickness of the inner surface layer in the obtained belt was changed to 0.3 mm.

Example 3

A raw edge double cogged V-belt was produced in the same manner as in Example 1, except that the thickness of the compression rubber layer main body in the obtained belt was changed to 9.0 mm, and the thickness of the inner surface layer in the obtained belt was changed to 0.5 mm.

Example 4

A raw edge double cogged V-belt was produced in the same manner as in Example 1, except that the thickness of the compression rubber layer main body in the obtained belt was changed to 8.5 mm, and the thickness of the inner surface layer in the obtained belt was changed to 1.0 mm.

Example 5

A raw edge double cogged V-belt was produced in the same manner as in Example 1, except that the thickness of the compression rubber layer main body in the obtained belt was changed to 7.5 mm, and the thickness of the inner surface layer in the obtained belt was changed to 2.0 mm.

Example 6

A raw edge double cogged V-belt was produced in the same manner as in Example 1, except that the thickness of the compression rubber layer main body in the obtained belt was changed to 7.0 mm, and the thickness of the inner surface layer in the obtained belt was changed to 2.5 mm.

Examples 7 to 12

In Examples 7 to 12, raw edge double cogged V-belts were produced in the same manner as in Examples 1 to 6, except that R5 was used instead of R4 for the inner surface layer of the compression rubber layer.

Comparative Example 1

R1 was used for the tension rubber layer, R2 was used for the adhesion rubber layer, and only R1 was used for the compression rubber layer to produce a raw edge double cogged V-belt in which a compression rubber layer was a single-layer structure. In the obtained belt, a thickness of the compression rubber layer was 9.5 mm. Namely, this is a form where each of the inner circumferential surfaces of the compression rubber layer main bodies in Examples 1 to 12 is not covered with the inner surface layer, and the belt inner circumferential surface is formed of R1.

Comparative Example 2

A raw edge double cogged V-belt in which a compression rubber layer was a single-layer structure was produced in the same manner as in Comparative Example 1, except that only R4 was used for the compression rubber layer. That is, this is a form where not only the inner surface layer but also the compression rubber layer main body in each of Examples 1 to 6 was formed of R4. The entire compression rubber layer was formed of R4.

Comparative Example 3

A raw edge double cogged V-belt in which an inner circumferential surface of a compression rubber layer main body was covered with a reinforcing fabric was produced in the same manner as in Example 1, except that the reinforcing fabric was used instead of the inner surface layer of the compression rubber layer. That is, the belt inner circumferential surface was formed by the reinforcing fabric. In this form, a thickness of a reinforcing fabric layer was 0.3 mm.

Reference Example 1

A rubber-attached reinforcing fabric obtained by friction-treating the reinforcing fabric used in Comparative Example 3 with the rubber composition (R4) was produced. A raw edge double cogged V-belt in which an inner circumferential surface of a compression rubber layer main body was covered with the rubber-attached reinforcing fabric was produced in the same manner as in Example 1, except that the rubber-attached reinforcing fabric was used instead of the inner surface layer of the compression rubber layer. That is, this is a form where the inner surface layer of the belt in each of Examples is disposed as the rubber-attached reinforcing fabric layer (reinforcing fabric is embedded in the rubber composition). In this form, a thickness of the rubber-attached reinforcing fabric layer was 0.5 mm, and an outermost surface of the rubber-attached reinforcing fabric layer (belt inner circumferential surface) was formed of a thin film of R4 with a thickness of 0.2 mm.

Evaluation results of the raw edge double cogged V-belts obtained in Examples 1 to 12, Comparative Examples 1 to 3, and Reference Example 1 are shown in Table 4.

TABLE 4

| | | | 1 | 2 | 3 | 4 | 5 | 6 | 7 | 8 | 9 |
|---|---|---|---|---|---|---|---|---|---|---|---|
| | | | | | | | Example | | | | |
| Compression rubber layer | Main body | | | | | | R1 | | | | |
| | | Hardness Hs (type A) (°) | | | | | 93 | | | | |
| | Inner surface layer | | | | R4 | | | | | R5 | |
| | | Hardness Hs (type A) (°) | | | 54 | | | | | 76 | |
| | | Thickness (mm) | 0.2 | 0.3 | 0.5 | 1.0 | 2.0 | 2.5 | 0.2 | 0.3 | 0.5 |
| | Friction coefficient of belt inner circumferential surface | | 0.58 | 0.58 | 0.56 | 0.53 | 0.57 | 0.55 | 0.53 | 0.52 | 0.51 |
| Durability running test | Top durability: cog valley crack resistance Running time (hr) | | 134 | 135 | 134 | 143 | 162 | 115 | 140 | 137 | 135 |
| | | Determination | a | a | a | a | a | b | a | a | a |
| | Low durability: cord peeling resistance Running time (hr) | | 36 | 35 | 35 | 33 | 24 | 12 | 38 | 39 | 40 |
| | | Determination | a | a | a | a | b | b | a | a | a |
| Actual vehicle test | Engine braking performance | Initial | a | a | a | a | a | a | a | a | a |
| | | After running | c | b | a | a | a | a | c | b | a |
| | Engine braking persistence | | c | b | a | a | a | a | c | b | a |
| Comprehensive determination | | | C | B | A | A | B | C | C | B | A |

| | | | 10 | 11 | 12 | 1 | 2 | 3 | 1 |
|---|---|---|---|---|---|---|---|---|---|
| | | | Example | | | Comparative Example | | | Reference Example |
| Compression rubber layer | Main body | | | R1 | | R1 | R4 | R1 | R1 |
| | | Hardness Hs (type A) (°) | | 93 | | 93 | 54 | 93 | 93 |
| | Inner surface layer | | | R5 | | no | no | Reinforcing fabric | R4-attached reinforcing fabric |
| | | Hardness Hs (type A) (°) | | 76 | | — | — | — | 54 |
| | | Thickness (mm) | 1.0 | 2.0 | 2.5 | — | — | 0.3 | 0.5 |
| | Friction coefficient of belt inner circumferential surface | | 0.52 | 0.50 | 0.51 | 0.36 | 0.57 | 0.34 | 0.55 |
| Durability running test | Top durability: cog valley crack resistance Running time (hr) | | 137 | 157 | 124 | 127 | 65 | 140 | 158 |
| | | Determination | a | a | b | b | c | a | a |
| | Low durability: cord peeling resistance Running time (hr) | | 34 | 25 | 13 | 36 | 5 | 33 | 32 |
| | | Determination | a | a | b | a | c | a | a |
| Actual vehicle test | Engine braking performance | Initial | a | a | a | c | a | c | a |
| | | After running | a | a | a | — | a | — | c |
| | Engine braking persistence | | a | a | a | — | a | — | c |
| Comprehensive determination | | | A | B | C | D | D | D | C |

In Comparative Example 1, the compression rubber layer main body is formed of R1, and the inner circumferential surface of the compression rubber layer main body is not covered with the inner surface layer. A friction coefficient of the belt inner circumferential surface formed of R1 was a low value of 0.36. In the durability running test, a was determined in the Low durability (lateral pressure resistance; cord peeling resistance), and b was determined in the Top durability (bending fatigue resistance; cog valley crack resistance), which were pass levels, but a sufficient frictional force was not obtained, and the engine braking performance was determined as c (fail), and a D rank was made in the comprehensive determination.

In Comparative Example 2, not only the inner surface layer but also the compression rubber layer main body was formed of R4. Since the friction coefficient of the belt inner circumferential surface formed of R4 was a high value of 0.57, a sufficient frictional force was obtained and the engine braking performance was determined as a (pass). On the other hand, since the entire compression rubber layer was formed of R4, which had low rigidity, in the durability running test, the life was reached early due to insufficient rigidity in both the Low durability test (lateral pressure resistance; cord peeling resistance) and the Top durability test (bending fatigue resistance; cog valley crack resistance), and the determination was made as c (fail), and a D rank was made in the comprehensive determination.

In Comparative Example 3, the inner circumferential surface of the compression rubber layer main body was covered with the reinforcing fabric, and the friction coefficient of the belt inner circumferential surface formed by the reinforcing fabric was a low value of 0.34. In the durability running test, a was determined in the Low durability test (lateral pressure resistance; cord peeling resistance) and the Top durability test (bending fatigue resistance; cog valley crack resistance), but a sufficient frictional force was not obtained, the engine braking performance was determined as c (fail), and a D rank was made in the comprehensive determination.

In Examples 1 to 6, the compression rubber layer had a two-layer structure by using R1 for the compression rubber layer main body and R4 for the inner surface layer of the compression rubber layer. In any case, the friction coefficient of the belt inner circumferential surface formed of R4 was a high value of 0.53 to 0.58. Therefore, the sufficient frictional force was obtained, and the engine braking performance was determined as a (pass).

In particular, when the thickness of the inner surface layers was 0.5 mm (Example 3) and 1.0 mm (Example 4), a (pass) was determined in all of the test items (Low durability test, Top durability test, engine braking performance, engine braking persistence), and an A rank was made in the comprehensive determination.

When the thickness of the inner surface layer was increased to 2.0 mm (Example 5), the lateral pressure resistance decreased and b was determined in the Low durability test, and a B rank was made in the comprehensive determination. When the thickness of the inner surface layer was increased to 2.5 mm (Example 6), the life in the Low durability test (lateral pressure resistance) was further shortened (determined as b), and the life in the Top durability test (bending fatigue resistance; cog valley crack resistance) was also shortened (determined as b), and a C rank was made in the comprehensive determination.

When the thickness of the inner surface layer was decreased to 0.3 mm (Example 2), the Low durability test, the Top durability test, and the engine braking performance were initially determined as a at the same levels as those in Examples 3 and 4, but when the inner surface layer was worn out during running to expose the compression rubber layer main body, the braking performance became ineffective, and thus the braking performance after running was determined as b, and the persistence of the braking performance decreased to be determined as b, and a B rank was made in the comprehensive determination.

When the thickness of the inner surface layer was decreased to 0.2 mm (Example 1), the Low durability test, the Top durability test, and the engine braking performance were determined as a at the same levels as those in Examples 3 and 4, but when the inner surface layer was worn out early to expose the compression rubber layer main body, the braking performance became ineffective, and thus the braking performance after running was determined as c, and the persistence of the braking performance cannot be obtained and was determined as c, and a C rank was made in the comprehensive determination.

In Examples 7 to 12, the inner surface layers of the compression rubber layers in Examples 1 to 6 were changed from R4 to R5, and the compression rubber layers each had a two-layer structure. In these Examples, the friction coefficients of the belt inner circumferential surfaces formed of R5 were high values of 0.50 to 0.53. Therefore, the sufficient frictional force was obtained, and the engine braking performance was determined as a (pass).

When the thickness of the inner surface layer was changed to 0.2 mm (Example 7), 0.3 mm (Example 8), 0.5 mm (Example 9), 1.0 mm (Example 10), 2.0 mm (Example 11), and 2.5 mm (Example 12), the same levels and tendency as those in Examples 1 to 6 were observed.

Reference Example 1 was a form in which the inner circumferential surface of the compression rubber layer main body was covered with the rubber-attached reinforcing fabric, that is, a form in which the inner surface layer of the belt of Example was disposed as the rubber-attached reinforcing fabric layer (reinforcing fabric embedded in the rubber composition). In this form, the outermost surface of the rubber-attached reinforcing fabric layer (belt inner circumferential surface) was formed by a thin film of R4 with a thickness of 0.2 mm, and thus the friction coefficient of the belt inner circumferential surface formed of R4 was a high value of 0.55. Therefore, the sufficient frictional force was obtained, and the engine braking performance was determined as a (pass). However, when the thin film of R4 (thickness 0.2 mm) worn out early to expose the reinforcing fabric, the braking performance became ineffective, and thus the persistence of the braking performance was not obtained and was determined as c, and a C rank was made in the comprehensive determination.

As described above, from the results of the durability running test (Top durability test, Low durability test), the braking performance test, and the braking persistence test, when a comprehensive superiority or inferiority is determined (ranked) from the viewpoint of exhibiting the braking performance while securing the bending fatigue resistance (cog valley crack resistance) and lateral pressure resistance (cord peeling resistance) at a level required for the variable speed belt, it can be said that it is effective to form a two-layer structure by providing an inner surface layer with a high friction coefficient on the inner circumferential surface of the compression rubber layer main body. It could be confirmed that the braking function (high frictional force) was exhibited when the friction coefficient of the inner surface layer of the compression rubber layer was about 0.50 to 0.58.

It was confirmed that the braking function (high frictional force) was exhibited when an average thickness of the inner surface layer was in a range of 0.2 mm to 2.5 mm, but from a viewpoint of a balance between the persistence of the braking performance and the lateral pressure resistance, it could be said that the range of 0.5 mm to 2.0 mm was particularly suitable.

Example 13

In Example 13, a raw edge double cogged V-belt was produced in the same manner as in Example 3, except that R6 was used instead of R4 for the inner surface layer of the compression rubber layer.

Example 14

In Example 14, a raw edge double cogged V-belt was produced in the same manner as in Example 3, except that R3 was used instead of R4 as for the inner surface layer of the compression rubber layer.

Example 15

In Example 15, a raw edge double cogged V-belt was produced in the same manner as in Example 3, except that R7 was used instead of R4 for the inner surface layer of the compression rubber layer.

Evaluation results of the raw edge double cogged V-belts obtained in Examples 13 to 15 are shown in Table 5 together with the results of Examples 3 and 9.

TABLE 5

| | | | Example | | | | |
|---|---|---|---|---|---|---|---|
| | | | 13 | 3 | 9 | 14 | 15 |
| Compression rubber layer | Main body | | | | R1 | | |
| | | Hardness Hs (type A) (°) | | | 93 | | |
| | Inner surface layer | | R6 | R4 | R5 | R3 | R7 |
| | | Hardness Hs (type A) (°) | 46 | 54 | 76 | 82 | 84 |
| | | Thickness (mm) | | | 0.5 | | |
| | Friction coefficient of belt inner circumferential surface | | 0.60 | 0.56 | 0.51 | 0.42 | 0.39 |
| Durability running test | Top durability: cog valley crack resistance Running time (hr) | | 135 | 134 | 135 | 135 | 135 |
| | Determination | | a | a | a | a | a |
| | Low durability: cord peeling resistance Running time (hr) | | 36 | 35 | 40 | 38 | 38 |
| | Determination | | a | a | a | a | a |
| Actual vehicle test | Engine braking performance | Initial | a | a | a | b | b |
| | | After running | b | a | a | b | c |
| | Engine braking persistence | | b | a | a | b | c |
| | Comprehensive determination | | B | A | A | B | C |

In Example 13, the rubber composition of the inner surface layer in Example 3 was changed from R4 to R6. That is, this is a form where the rubber composition with a friction coefficient higher than that in Example 3 was used. Although the durability running performance and engine braking performance were at a high level (determined as a), the inner surface layer was formed of a rubber composition with low mechanical strength (rubber hardness, tensile strength), and thus the layer disappeared relatively early due to wearing, and the engine braking persistence was determined as b, and a B rank was made in the comprehensive determination.

In Examples 14 and 15, the rubber composition of the inner surface layer in Example 3 was changed from R4 to R3 and R7, respectively. That is, this is a form where the rubber composition with a friction coefficient lower than that in Example 3 was used. Although the durability running performance was determined as a, the engine braking performance was slightly lower (determined as b). In Example 14 in which the friction coefficient of the belt inner circumferential surface was 0.42, the engine braking performance persisted after 500 miles of running (persistence determined as b), and a B rank was made in the comprehensive determination. In Example 15 in which the friction coefficient of the belt inner circumferential surface was 0.39, the engine braking performance decreased after 500 miles of running (persistence determined as c), and a C rank was made in the comprehensive determination.

From the above results, it is found that the friction coefficient of the belt inner circumferential surface is preferably 0.40 or more, and more preferably 0.50 or more, in terms of the level of engine braking performance.

In Table 5, the friction coefficient decreases in the order of Example 13 (friction coefficient 0.60), Example 3 (friction coefficient 0.56), Example 9 (friction coefficient 0.51), Example 14 (friction coefficient 0.42), and Example 15 (friction coefficient 0.39), and the comprehensive determination was A or B rank in Examples having friction coefficient of 0.40 or more, and was C rank in Example 15 having friction coefficient of 0.39. Other examples do not contain the short fiber, whereas Example 15 contains the short fiber and the friction coefficient is less than 0.40, and thus it is preferable not to dispose a fiber material such as the short fiber on the belt inner circumferential surface.

INDUSTRIAL APPLICABILITY

The raw edge cogged V-belt of the present invention is suitable as a power-transmission V-belt used in a power-transmission system that requires a high frictional force on an inner circumferential surface. In particular, the raw edge cogged V-belt can be used as a variable speed belt used in a belt clutch-in type CVT for a snowmobile (small snow vehicles), an all-terrain vehicle (ATV), and the like, and is suitable as a variable speed belt used in a belt clutch-in type CVT in which a belt inner circumferential surface comes into contact a pulley shaft portion during idling.

Although the present invention has been described in detail with reference to specific embodiments, it is apparent to those skilled in the art that various modifications and changes can be made without departing from the spirit and scope of the present invention.

The present application is based on Japanese Patent Application No. 2022-080410 filed on May 16, 2022 and Japanese Patent Application No. 2023-073007 filed on Apr. 27, 2023, and the content thereof is incorporated herein by reference.

REFERENCE SIGNS LIST

1: raw edge cogged V-belt
1a: inner circumferential cog ridge
1b: inner circumferential cog valley
1c: outer circumferential cog ridge
1d: outer circumferential cog valley
2: tension rubber layer
3: tension member layer (adhesion rubber layer)
3a: tension member (cord)
4: compression rubber layer
4a: compression rubber layer main body
4b: inner surface layer

33

The invention claimed is:

1. A raw edge cogged V-belt, comprising:

a cog at least on an inner circumferential surface side; and a compression rubber layer disposed on the inner circumferential surface side, wherein the compression rubber layer comprises a compression rubber layer main body and an inner surface layer covering an inner circumferential surface of the compression rubber layer main body, a friction coefficient of a surface of the inner surface layer is higher than a friction coefficient of a surface of the compression rubber layer main body that is not covered with the inner surface layer, and an average thickness of the inner surface layer is 0.3 mm to 2 mm.

2. The raw edge cogged V-belt according to claim 1, wherein the friction coefficient of the surface of the inner surface layer is 0.4 to 0.7.

3. The raw edge cogged V-belt according to claim 1, wherein a rubber hardness Hs (type A) of the inner surface layer is 82° or less, and a rubber hardness Hs (type A) of the compression rubber layer main body is 89° or more.

4. A belt power-transmission system, comprising:

the raw edge cogged V-belt according to claim 1; and a pulley, wherein the raw edge cogged V-belt is a variable speed belt used in a belt clutch-in type continuously variable transmission.

5. The belt power-transmission system according to claim 4, wherein the belt clutch-in type continuously variable transmission is a continuously variable transmission in which a belt inner circumferential surface comes into contact with a pulley shaft portion during idling.

6. The belt power-transmission system according to claim 4, wherein the belt clutch-in type continuously variable transmission is a continuously variable transmission that utilizes a frictional force between a belt inner circumferential surface and a pulley shaft portion.

* * * * *